United States Patent
Kalsi et al.

(10) Patent No.: US 6,460,635 B1
(45) Date of Patent: Oct. 8, 2002

(54) LOAD RESPONSIVE HYDRODYNAMIC BEARING

(75) Inventors: Manmohan S. Kalsi, Houston; Dezso Somogyi, Sugar Land; Lannie L. Dietle, Stafford, all of TX (US)

(73) Assignee: Kalsi Engineering, Inc., Sugar Land, TX (US)

( * ) Notice: Subject to any disclaimer, the term of this patent is extended or adjusted under 35 U.S.C. 154(b) by 0 days.

(21) Appl. No.: 09/696,694

(22) Filed: Oct. 25, 2000

Related U.S. Application Data
(60) Provisional application No. 60/161,519, filed on Oct. 25, 1999.

(51) Int. Cl.[7] ............................................. E21B 10/24
(52) U.S. Cl. .................... 175/229; 175/372; 384/93; 384/95; 277/307; 277/400; 277/402
(58) Field of Search .................... 175/227–229, 175/372; 384/95–97, 93, 100; 277/301, 304, 305, 307, 309, 359, 399, 400, 402

(56) References Cited

U.S. PATENT DOCUMENTS

| | | |
|---|---|---|
| 3,765,495 A | 10/1973 | Murdoch et al. |
| 4,240,676 A | 12/1980 | Anderson et al. |
| 4,358,384 A | 11/1982 | Newcomb |
| 4,375,242 A | 3/1983 | Galle |
| 4,421,425 A | 12/1983 | Foucher et al. |
| 4,496,251 A | 1/1985 | Ide |
| 4,515,486 A | 5/1985 | Ide |
| 4,610,319 A | 9/1986 | Kalsi |
| 4,657,091 A | 4/1987 | Higdon |
| 4,676,668 A | 6/1987 | Ide |
| 4,770,548 A * | 9/1988 | Otto |
| 4,899,838 A | 2/1990 | Sullivan et al. |
| 4,981,182 A * | 1/1991 | Dysart |
| 5,015,401 A | 5/1991 | Landry et al. |

(List continued on next page.)

*Primary Examiner*—Roger Schoeppel
(74) *Attorney, Agent, or Firm*—James L. Jackson; Andrews, Kurth, Mayor, Day, Caldwell & Keeton, LLP

(57) ABSTRACT

A load responsive hydrodynamic bearing is provided in the form of a thrust bearing or journal bearing for supporting, guiding and lubricating a relatively rotatable member to minimize wear thereof responsive to relative rotation under severe load. In the space between spaced relatively rotatable members and in the presence of a liquid or grease lubricant, one or more continuous ring shaped integral generally circular bearing bodies each define at least one dynamic surface and a plurality of support regions. Each of the support regions defines a static surface which is oriented in generally opposed relation with the dynamic surface for contact with one of the relatively rotatable members. A plurality of flexing regions are defined by the generally circular body of the bearing and are integral with and located between adjacent support regions. Each of the flexing regions has a first beam-like element being connected by an integral flexible hinge with one of the support regions and a second beam-like element having an integral flexible hinge connection with an adjacent support region. A least one local weakening geometry of the flexing region is located intermediate the first and second beam-like elements. In response to application of load from one of the relatively rotatable elements to the bearing, the beam-like elements and the local weakening geometry become flexed, causing the dynamic surface to deform and establish a hydrodynamic geometry for wedging lubricant into the dynamic interface.

39 Claims, 12 Drawing Sheets

U.S. PATENT DOCUMENTS

| | | | |
|---|---|---|---|
| 5,027,911 A | * 7/1991 | Dysart | |
| 5,054,938 A | 10/1991 | Ide | |
| 5,066,144 A | 11/1991 | Ide | |
| 5,102,236 A | 4/1992 | Ide | |
| 5,112,143 A | 5/1992 | Ide | |
| 5,137,373 A | 8/1992 | Ide | |
| 5,188,462 A | 2/1993 | Hooper et al. | |
| 5,222,815 A | 6/1993 | Ide | |
| 5,230,520 A | 7/1993 | Dietle et al. | |
| 5,265,964 A | 11/1993 | Hooper | |
| 5,275,493 A | 1/1994 | Ide | |
| 5,284,392 A | 2/1994 | Ide | |
| 5,307,887 A | 5/1994 | Welsh | |
| 5,372,431 A | 12/1994 | Ide | |
| 5,382,097 A | 1/1995 | Ide | |
| 5,393,145 A | 2/1995 | Ide | |
| 5,455,778 A | 10/1995 | Ide et al. | |
| 5,456,327 A | 10/1995 | Denton et al. | |
| 5,459,674 A | 10/1995 | Ide et al. | |
| 5,489,155 A | 2/1996 | Ide | |
| 5,503,479 A | 4/1996 | Ide | |
| 5,513,917 A | 5/1996 | Ide et al. | |
| 5,515,458 A | 5/1996 | Ide | |
| 5,531,524 A | 7/1996 | Brouwer | |
| 5,549,392 A | 8/1996 | Anderson | |
| 5,556,208 A | 9/1996 | Ide | |
| 5,558,444 A | 9/1996 | Ide | |
| 5,593,231 A | 1/1997 | Ippolito | |
| 5,603,574 A | 2/1997 | Ide et al. | |
| 5,620,260 A | 4/1997 | Ide | |
| 5,660,481 A | 8/1997 | Ide | |
| 5,664,888 A | 9/1997 | Sabin | |
| 5,738,358 A | 4/1998 | Kalsi et al. | |
| 5,873,576 A | 2/1999 | Dietle et al. | |
| 5,938,344 A | 8/1999 | Sabin | |
| 6,036,192 A | 3/2000 | Dietle et al. | |
| 6,109,618 A | 8/2000 | Dietle | |
| 6,120,036 A | 9/2000 | Kalsi et al. | |

* cited by examiner

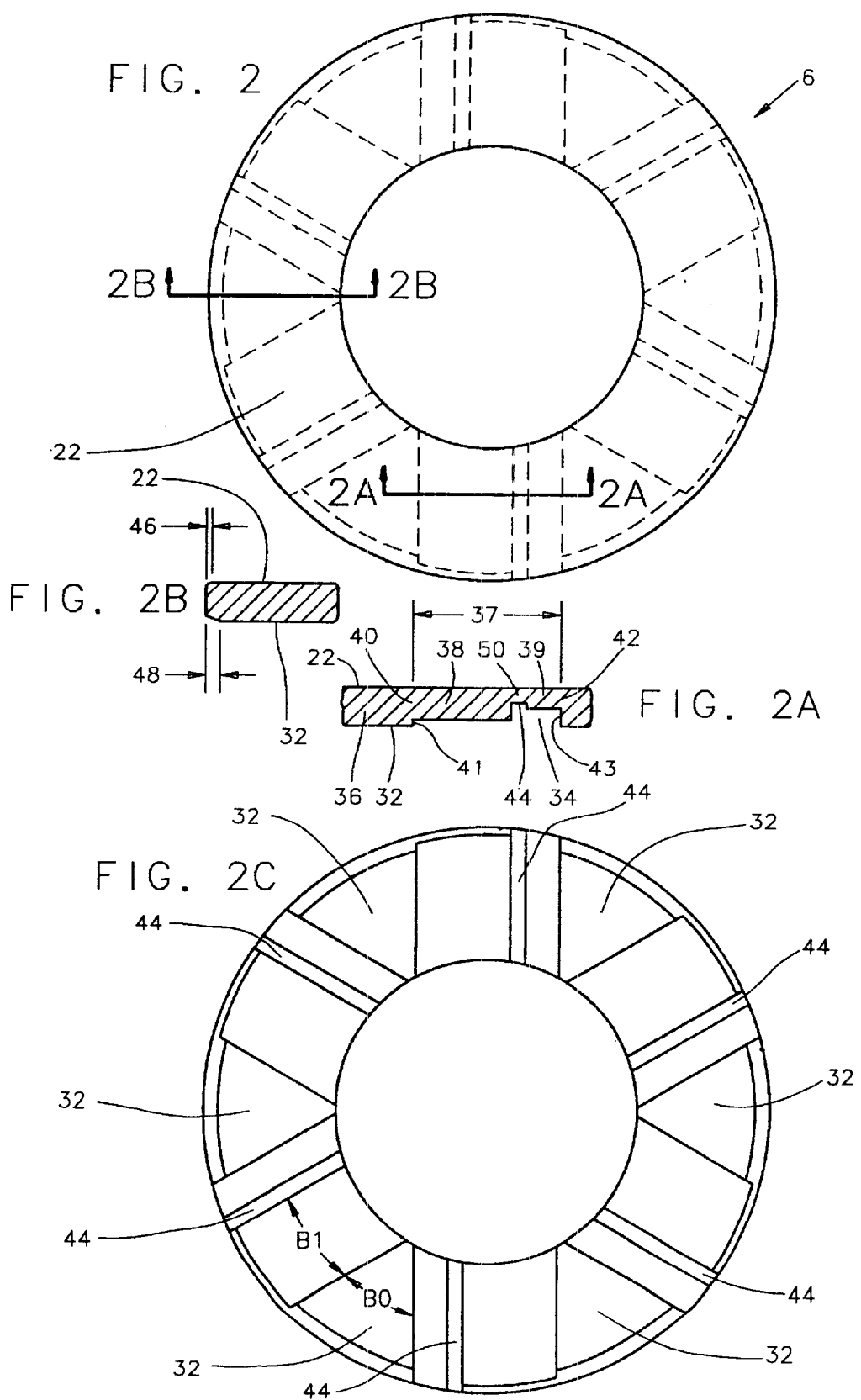

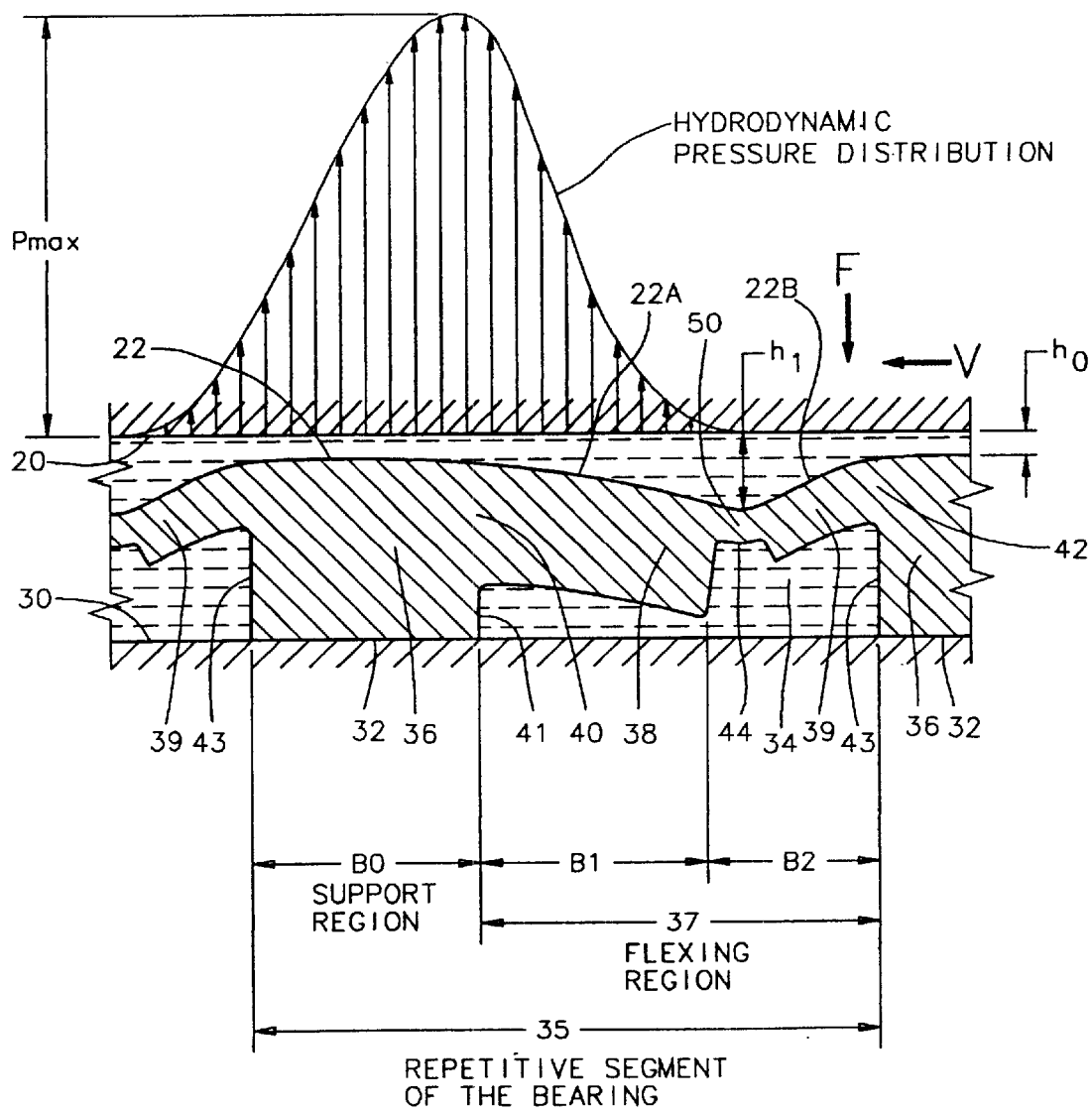

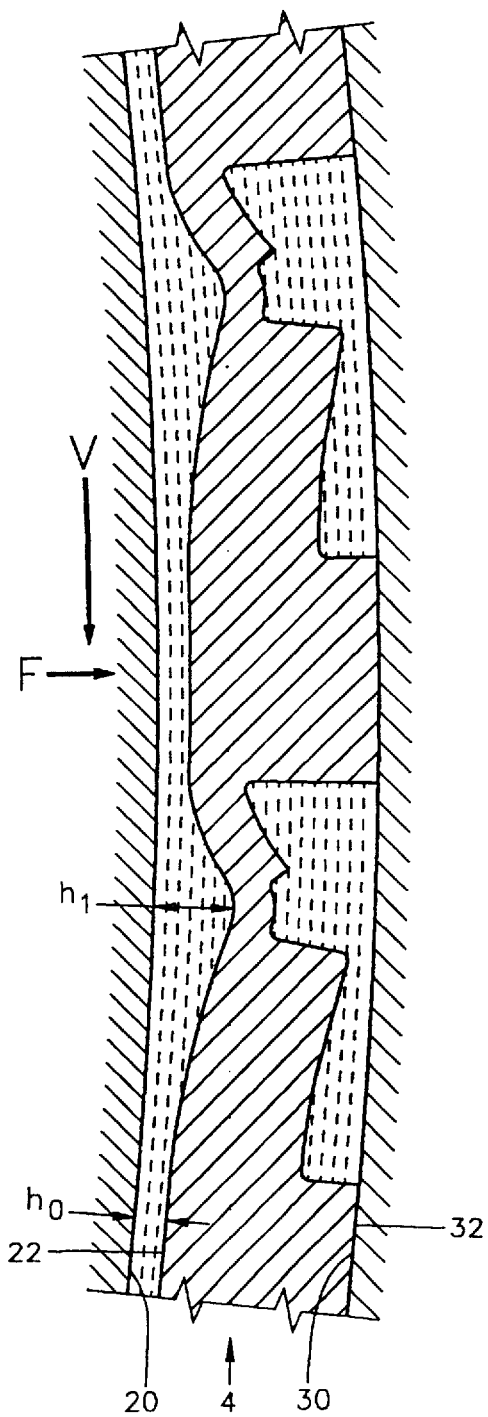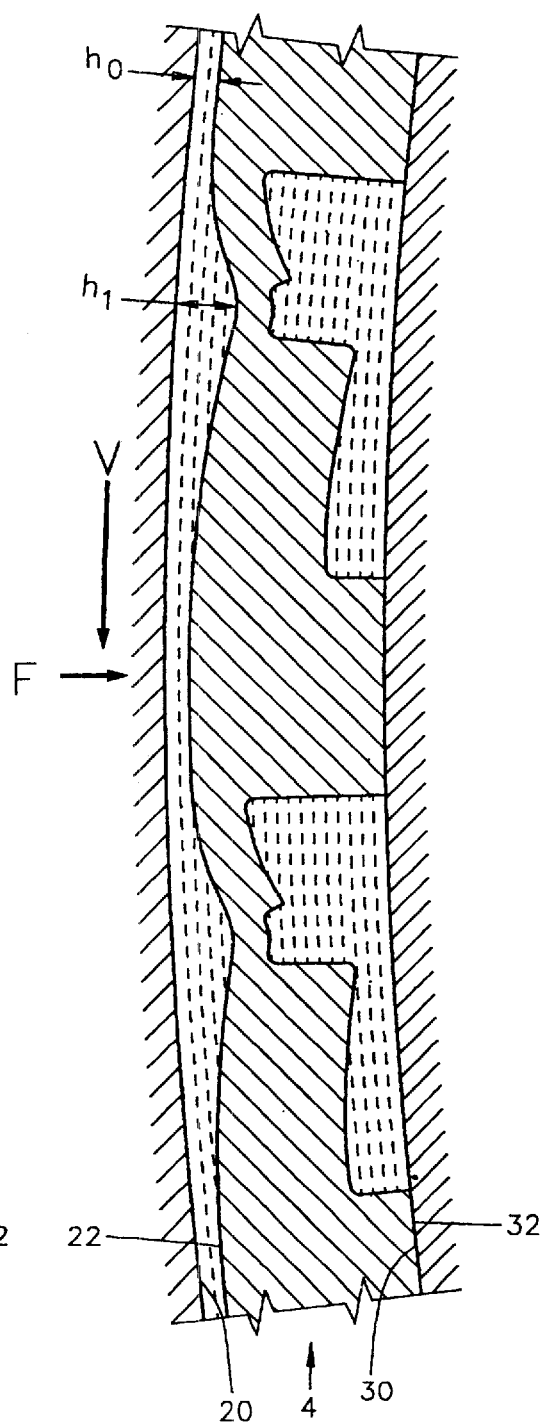

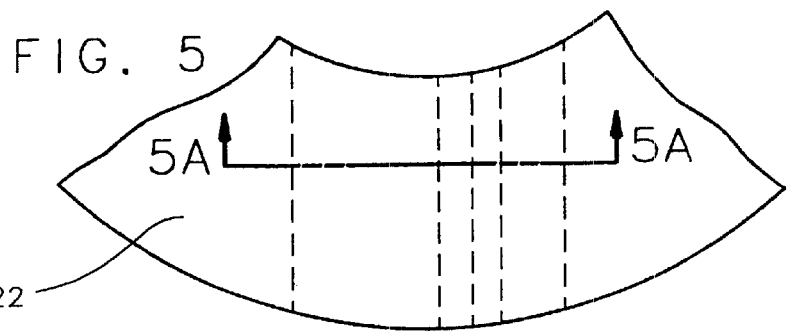
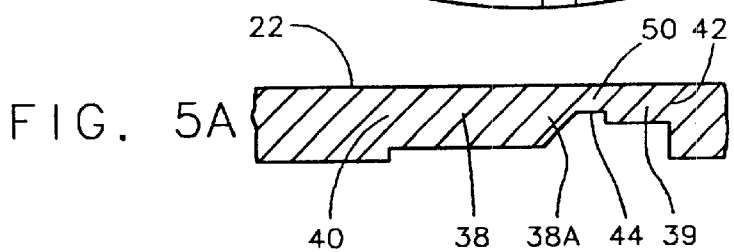
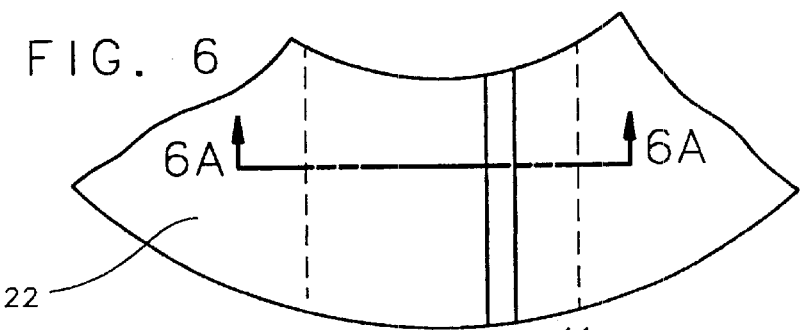
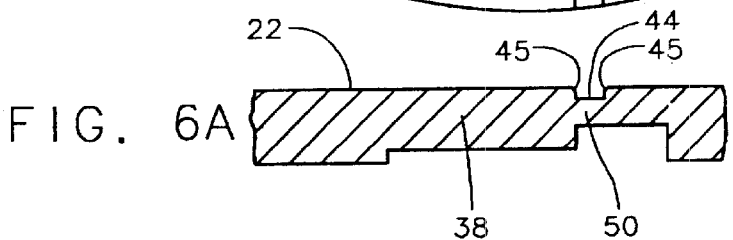
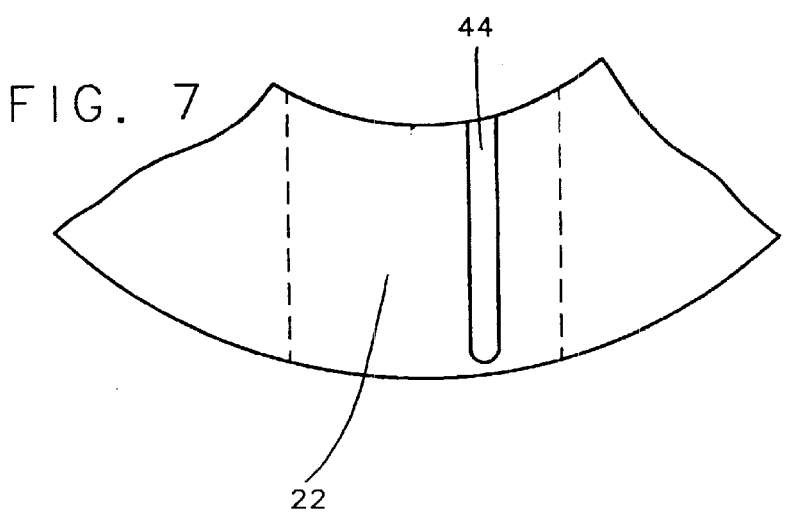

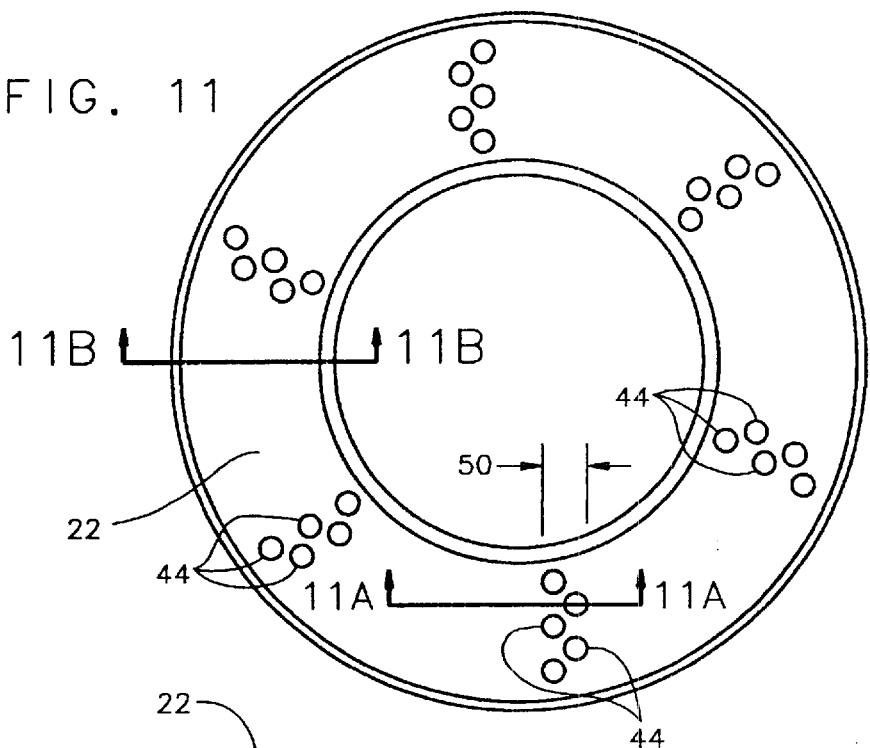
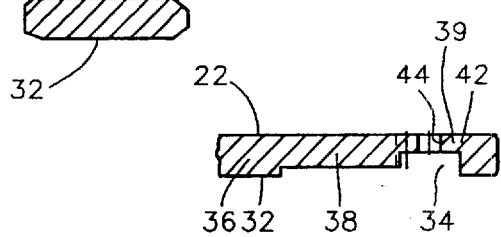
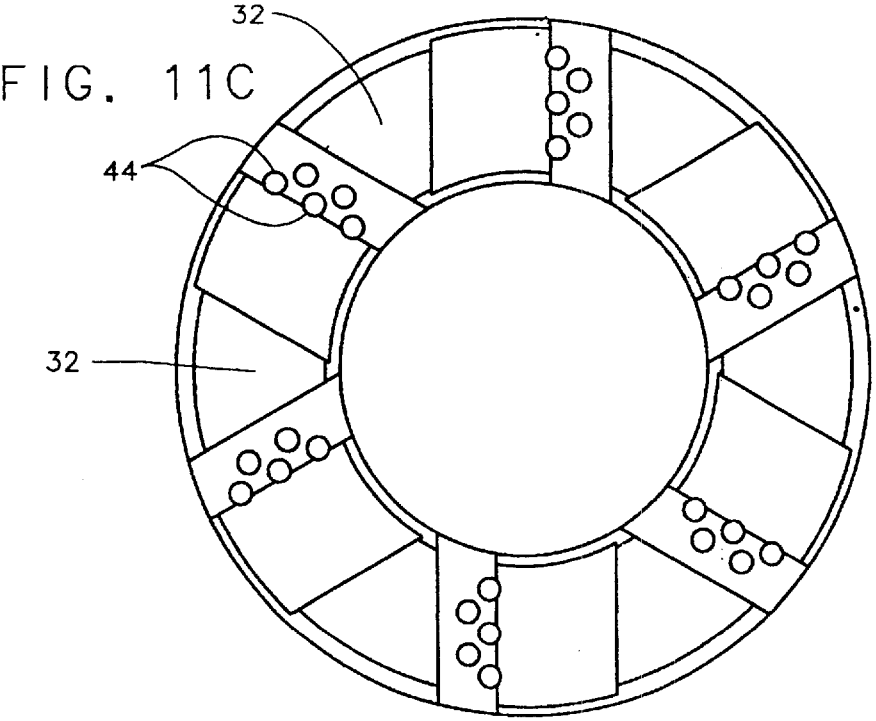

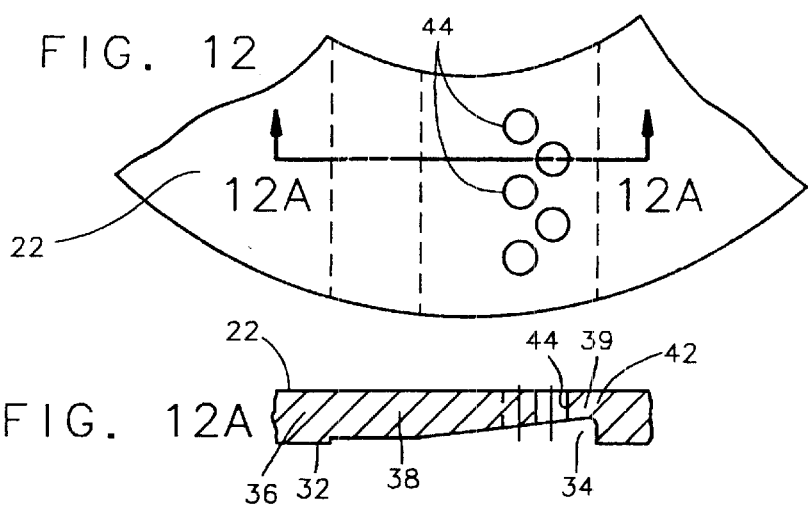
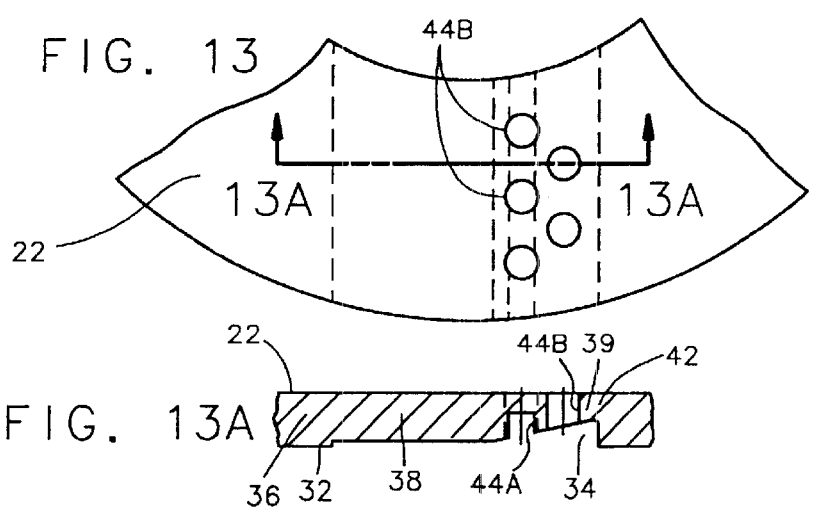
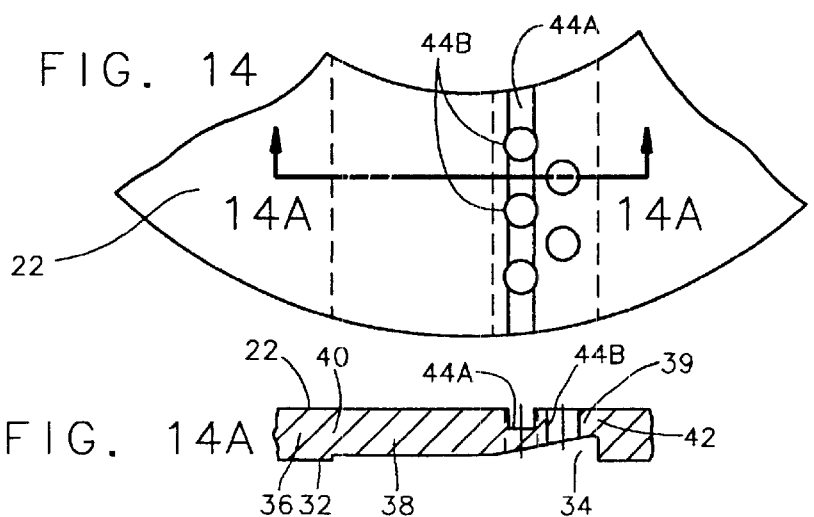

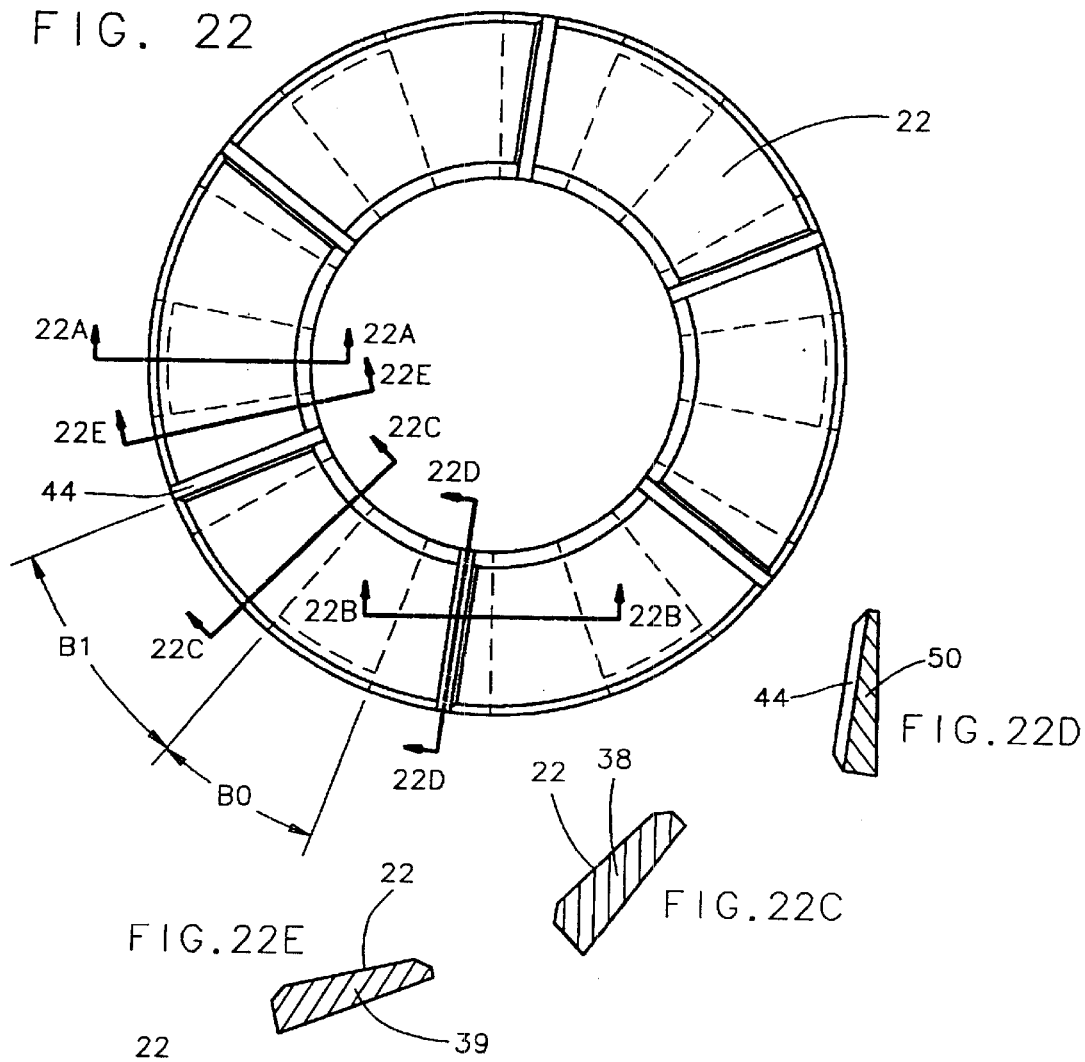

LOAD RESPONSIVE HYDRODYNAMIC BEARING

This application claims the benefit of U.S. Provisional Application Serial No. 60/161,519 filed Oct. 25, 1999 and entitled "Load Responsive Flexing Pad Hydrodynamic Bearings".

This invention was made with United States Government support under Contract No. DE-FG03 96 ER 82199 awarded by the Department of Energy. The United States Government therefore has certain rights in this invention.

BACKGROUND OF THE INVENTION

This invention relates generally to providing a reliable bearing and seal system for sealed bearing rotary cone-type rock bits used in hard rock drilling to permit significant increases in the speed and load capability thereof, and more particularly relates to a load responsive elastically flexing bearing design that provides hydrodynamic lubrication of the loaded bearing surfaces in response to relative rotation, thereby permitting the bearing to carry heavier loads at higher speeds while generating less heat than prior art drill bit bearings, and permitting the bearing to be lubricated with liquid oil-type lubricants such as synthetic oils that provide improved compatibility with elastomeric seals compared to the greases presently used in rock bits.

Rotary drilling techniques are used to penetrate into the earth to create wells for obtaining oil and gas. In order to drill through the rock which is encountered in such endeavors, a drill bit is employed at the bottom of a hollow drill string.

A rotary cone-type rock bit is commonly used for such drilling. In such bit designs, rotary cones incorporating patterns of cutting teeth are mounted on support shaft structures at the lower extremity of the drill bit. When the bit is rotated, the rotary cones rotate about the shafts and roll upon the bottom of the bore hole, and the weight of the drill string acting through the cutting teeth causes the rock formation to be broken up into small cuttings. Drilling fluid is circulated down through the drill string and into the bottom of the bore hole to transport the cuttings back to the earth's surface. An example of such well known prior art drill bits is shown in U.S. Pat. No. 5,456,327 to Denton et al.

Thrust and journal bearings are typically employed to transfer the weight of the drill string from the shaft to the rotary cone, and ball bearings are typically employed to retain the rotary cones to the shaft. A grease-type lubricant, pressure balanced to the annulus of the well bore, is provided to lubricate the bearings. Drill bit bearings are expected to operate under very harsh conditions which include elevated temperature, high loading, extreme impact, and complex movement between the rotary cone and the shaft. Due to the severe geometrical constraints the bearings are small. Relative to their small size, these bearings are severely loaded, and the bearing contact stresses reach extremely high levels. As a result, the bearings perform poorly when operated at higher speeds, especially when higher loads are employed, which limits life in hard rock drilling.

Conventional rock bit bearings operate in a boundary lubrication regime, and are lubricated with greases that are heavily loaded with solid lubricants such as graphite, molybdenum disulphide, powdered calcium fluoride, copper particles and various types of soap to help carry the heavy bearing loads. Examples of such greases are described in U.S. Pat. No. 4,358,384 to Newcomb and U.S. Pat. No. 5,015,401 to Landry.

An elastomeric rotary seal is used to establish dynamic sealed relation between the rotary cone and the shaft in order to retain the lubricant and exclude the highly abrasive drilling fluid. Examples of such seals are described in U.S. Pat. No. 3,765,495 to Murdoch et. al. and U.S. Pat. No. 4,610,319 to Kalsi. In addition to the bearings, rotary seals are also a weak link in the reliability and life of the bearing systems employed in high speed rotary cone bits. Firstly, the solid lubricants contained in rock bit bearing greases are highly abrasive to elastomeric rotary seals. Secondly, these seals are prone to wear due to the harsh abrasive drilling fluid environment within which the drill bit operates. Thirdly, as the speed increases, higher heat generation by the bearings and the rotary seal causes thermal degradation of the elastomer material of the seal. These factors, coupled with the higher seal wear rate associated with high speed operation, can lead to early seal failure, permitting abrasive invasion of the bearings, and rapid bearing failure which can in severe cases even lead to loss of the rotary cone downhole.

In order to replace the drill bit at the end of its useful life, it is necessary to first pull the entire drill string from the well. The downtime associated with the lengthy round trips required for such bit replacement can be a major component of the cost of drilling a well, particularly in wells of great depth. A significant reduction in the cost of oil and gas drilling can therefore be obtained by improving the reliability and life of the bearing and seal system used in rotary cone rock bits.

BRIEF SUMMARY OF THE INVENTION

It is an objective of the present invention to provide a reliable bearing and seal system for use in mechanical equipment subject to high bearing loads, such as sealed bearing rotary cone-type rock bits used in hard rock drilling.

It is another objective of this invention to provide compact hydrodynamically lubricated bearings that lower bearing friction to permit operation under higher loads and higher speeds while minimizing bearing wear, preventing seizure, and remaining effective even as wear occurs at the bearing interface.

It is another objective of this invention to reduce bearing generated heat to prevent heat-related degradation of lubricant, bearings, elastomer seals, and associated components.

It is another objective of this invention to provide a bearing that is capable of providing hydrodynamic lubrication of bearing surfaces while employing a grease-type lubricant containing a high content of solid lubricant particles.

It is another objective of this invention to provide bearings for sealed bearing rotary cone-type rock bits that can operate under high loading in a liquid oil-type lubricant environment, such as a synthetic oil.

It is another objective of this invention to provide a compact bearing that can withstand high shock loads while maintaining low friction operation.

It is another objective of this invention to provide a sealed bearing rotary cone-type rock bit that maintains the integrity of the sealed bearing system seals and bearings by employing a liquid oil-type lubricant such as a high viscosity synthetic oil.

It is another objective of this invention to provide a compact bearing that permits low friction operation over a wide range of loads.

From the standpoint of the basic concept, this invention provides an improved bearing design of generally ring-like form for supporting and guiding a relatively rotatable member. Elastically flexing regions are incorporated into the bearing structure to create undulations in the bearing surface in response to the load and pressure applied to the bearing surface, to create an initial hydrodynamic wedge angle with respect to the mating surface of the relatively rotatable member. The gradually converging geometry created by these undulations promotes a strong hydrodynamic action that wedges a lubricant film of a predictable magnitude into the dynamic interface between the bearing and the relatively rotatable member in response to relative rotation. This film physically separates the dynamic surfaces away from each other, thus minimizing the asperity contact, thus reducing friction, wear and the heat produced by the bearing, while permitting operation at higher load and speed combinations. The bearing of the present invention has a continuous ring shaped body of generally circular form that defines at least one dynamic surface, and defines a plurality of support regions each defining a static face oriented in generally opposed relation with the dynamic face. A plurality of flexing regions are defined by undercut regions between adjacent support regions, it being preferred that the undercut regions be open-ended; i.e. passing completely through the bearing beam-section width from side to side. Each of the flexing regions incorporates a first beam having a first hinge connection with one of the plurality of support regions, and incorporates a second beam having a second hinge connection with another of the support regions; and incorporates at least one local weakening geometry between the first and second beams that defines a flexing knee region interconnecting said first and second beams. The flexibility of the first and second hinges can be controlled by the thickness of the respective first and second beams, or by the use of a hole or a hinge-defining groove or recess. The flexibility of the hinges can also be controlled through material selection.

The at least one dynamic surface can be configured in a substantially cylindrical configuration forming an internal or external generally cylindrical shape for reacting radially oriented loads, and the at least one dynamic surface can be alternately configured in a substantially planar configuration for receiving axially oriented loads. The at least one dynamic surface can also consist of two dynamic surfaces in generally opposed relation, such as one of the dynamic surfaces being of substantially cylindrical internal form and the other being of substantially cylindrical external form to support radial loads, or such as both dynamic surfaces being of substantially planar form to support axial thrust loads.

The local weakening geometry that defines the flexing knee region can be of any suitable form, such as a recess, or a plurality of recesses, or such as a hole or a plurality of holes, or such as a combination of one or more recesses and one or more holes. The recesses forming the local weakening geometry can be of any suitable shape such as forming an open ended slot or a closed-end slot; for example the slot could extend completely across the width of the bearing, or the slot could be of generally round, oval (obround) or elliptical shape, or of an L-type shape. The recess could also be of variable depth; for example being deeper at one end than at the other with a view toward managing the flexibility of the flexible knee section across the radial width of a thrust bearing embodiment of the invention. The walls of the recess can be of any suitable angle, including being substantially perpendicular to a dynamic surface or angulated with respect to a dynamic surface. Likewise, any holes forming the local weakening geometry can be of any suitable shape and orientation; for example a hole could extend completely or partially through the local geometry of the bearing to form the local weakening geometry, and could be of generally round, oval (obround) or elliptical shape. The walls and general orientation of the hole can be of any suitable angle, including substantially perpendicular to a dynamic surface or angulated with respect to a dynamic surface, including being substantially parallel to a dynamic surface. When a plurality of holes and/or recesses are employed to form the local weakening geometry, they can be located relative to one another in any suitable manner, for example they can be located adjacent to one another, or in generally opposed relation to one another. If desired, the local weakening geometry can form one or more lubrication passages to provide a lubricant feed to the dynamic interface.

The first and second beams can be of any suitable shape for controlled deflection, such as having a substantially parallel thickness, or such as being tapered in a direction substantially in line with the direction of rotational velocity and/or a direction substantially normal with the direction of rotational velocity to obtain controlled flexibility. When the bearing of the present invention is used in a thrust bearing configuration, it is preferred that the sides of the first and second beams be of generally arcuate shape, and when it is used in a radial bearing configuration, it is preferred that the sides be of generally planar shape. It is further preferred that the intersection between the dynamic surface and sides of the first and second beams be broken, such as by a chamfer, a radius, or an elliptical shape. Even though the ratio of the mean circumferential length of the first beam divided by the mean circumferential length of the support region can vary widely, it should be between 2 and 3, and preferably about 2.5 for optimum hydrodynamic lubrication generation.

This invention provides a reliable bearing and seal system for high speed sealed bearing rotary cone-type rock bits by providing a load responsive elastically flexing bearing design that provides hydrodynamic lubrication of the loaded bearing surfaces while generating less heat and permitting the bearing to be lubricated with liquid lubricants such as liquid lubricating oils or synthetic lubricating oils that provide higher compatibility with elastomeric seals compared to the cohesive-type lubricant greases containing solids presently used in rock bits. In particular, the optimum bearing and seal system for a sealed bearing rotary cone-type rock bit is preferred to consist of one or more of the load responsive hydrodynamic bearings described above in conjunction with a resilient compression-type rotary seal that defines hydrodynamic geometry to wedge a hydrodynamic film of lubricant into the dynamic sealing interface between the seal and shaft to allow the seal to better accommodate the high drill bit rotary speeds associated with drilling through hard rock formations.

The drill bit construction under consideration herein is generally known as a rotary cone type rock bit. The body structure of the drill bit provides at least one and usually a plurality of arm structures (typically 3) each having support shafts projecting therefrom which provide support for a rotary cone having a cutting structure thereon. Thrust and journal bearings, at least one of which being of the hydrodynamic bearing configuration described above, are employed to guide the rotation of the rotary cone and to transfer the weight of the drill string from the shaft to the rotary cone.

When the bit is rotated, the rotary cones rotate against the bottom of the bore hole, and the weight of the drill string acting through the cutting structure causes the rock formation to be broken up into cuttings. Drilling fluid is circulated down through the drill string, thence through one or more drill bit orifices into the bottom of the bore hole to transport the cuttings back to the earth's surface.

A lubricant is provided to lubricate the bearings. This lubricant may be a grease that is heavily loaded with solid lubricants such as graphite, molybdenum disulphide, powdered calcium fluoride, copper particles combined with one or more types of soap base, but in order to minimize rotary seal damage and thereby prolong the effective life of the drill bit bearings it is preferred that the lubricant be a liquid oil type lubricant, especially a high viscosity synthetic lubricant having a viscosity of 900 centistokes or more at 40° C.

A ring-shaped rotary seal of any suitable configuration is used to establish a sealed relationship between the rotary cone and the shaft in order to retain the lubricant and exclude the drilling fluid. The preferred seal is a compression-type seal having a ring-like body formed from resilient material that establishes static sealing engagement with the rotary cone and establishes relatively rotatable interference sealing engagement with the shaft. The preferred seal also incorporates a dynamic sealing lip which defines an axially varying shape on the lubricant side thereof for promoting hydrodynamic wedging activity that wedges a lubricant film into the dynamic sealing interface in response to relative rotation, and which employs an abrupt non-axially varying shape on the drilling fluid side for excluding the drilling fluid. By the presence of the lubricant film, this seal configuration eliminates direct rubbing contact between the surface of the seal and the mating surface of the shaft, thereby allowing high speeds without undue heat generation and seal wear. Such seals are described in the prior art of U.S. Pat. Nos. 4,610,319, 5,230,520, 5,738,358, 5,873,576, 6,036,192, 6,109,618 and 6,120,036, said patents being incorporated herein by reference for all purposes. The rotary seal may be composed of any one of a number of suitable sealing materials including elastomeric or rubber-like sealing material and various other polymeric sealing materials, and combinations thereof.

By combining hydrodynamic bearings and hydrodynamic seals into a rotary cone rock bit, a synergistic bearing and seal system is provided that provides long bit life while accommodating high speed operation under heavily loaded conditions.

The bearing of this invention, although primarily designed for enhancing the wear capabilities of bearings used in rock bits, also has application in other types of rotary equipment, with either the bearing housing or the shaft, or both, being the rotary member. Examples of such equipment include but are not limited to downhole drilling motors, downhole rotary steerable equipment, rotary well control equipment, and equipment used in construction, mining, dredging, and pumps where bearings are heavily loaded.

BRIEF DESCRIPTION OF THE DRAWINGS

So that the manner in which the above recited features, advantages and objects of the present invention are attained and can be understood in detail, a more particular description of the invention, briefly summarized above, may be had by reference to the preferred embodiment thereof which is illustrated in the appended drawings, which drawings are incorporated as a part hereof.

It is to be noted however, that the appended drawings illustrate only a typical embodiment of this invention and are therefore not to be considered limiting of its scope, for the invention may admit to other equally effective embodiments.

In the Drawings:

FIG. 1 is a sectional view illustrating a rotary cone assembly of a rotary cone type drill bit and showing load responsive hydrodynamic radial bearings and a load responsive hydrodynamic thrust bearing each embodying the principles of the present invention;

FIG. 2 is a plan view of the load responsive hydrodynamic thrust bearing of FIG. 1;

FIG. 2A is a sectional view of load responsive hydrodynamic thrust bearing of FIGS. 1 and 2, being taken along line 2A—2A of FIG. 2;

FIG. 2B is a sectional view of load responsive hydrodynamic thrust bearing of FIGS. 1 and 2, being taken along line 2B—2B of FIG. 2;

FIG. 2C is a bottom view of the load responsive hydrodynamic thrust bearing shown in FIG. 1 and in FIGS. 2, 2A and 2B;

Figure 8:
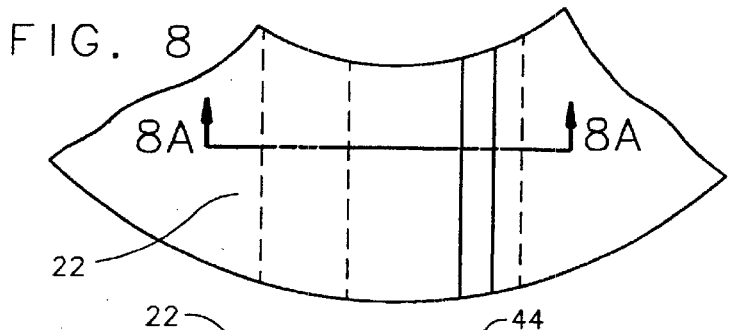
Figure 8A:
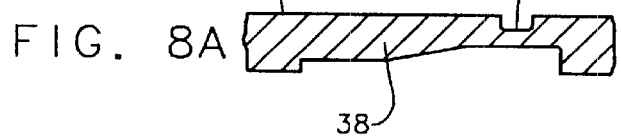
Figure 9:
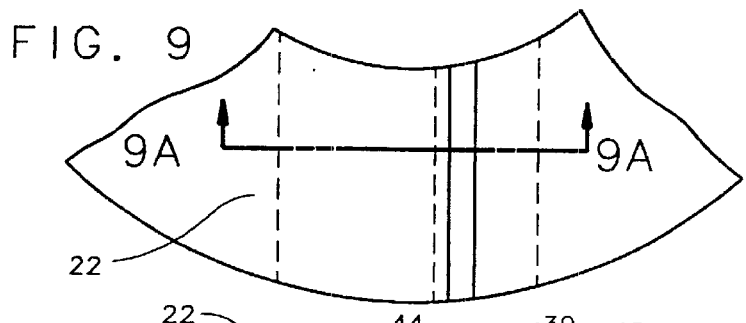
Figure 9A:
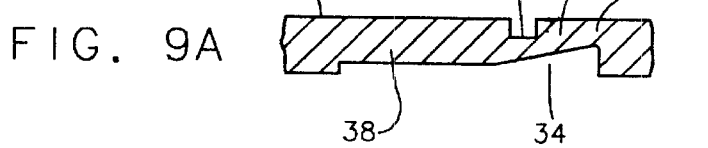
Figure 10:
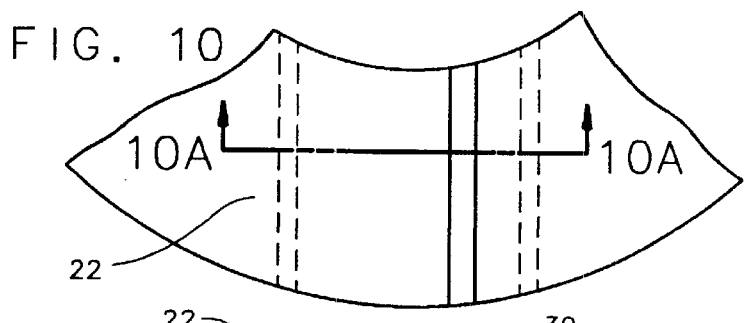
Figure 10A:
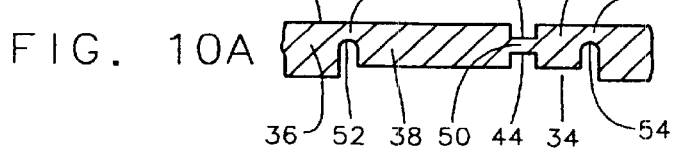
Figure 15:
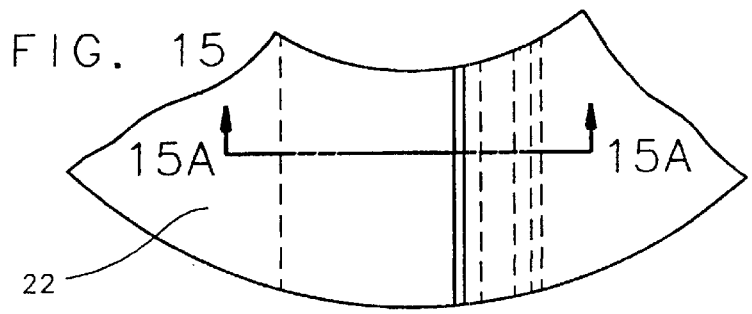
Figure 15A:
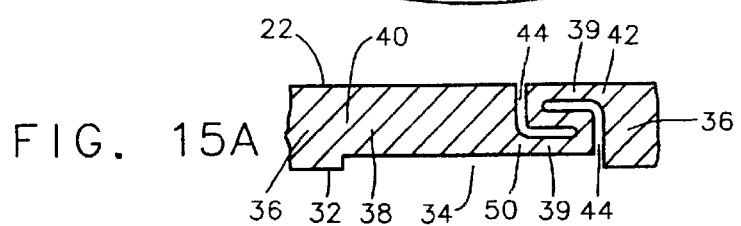
Figure 16:
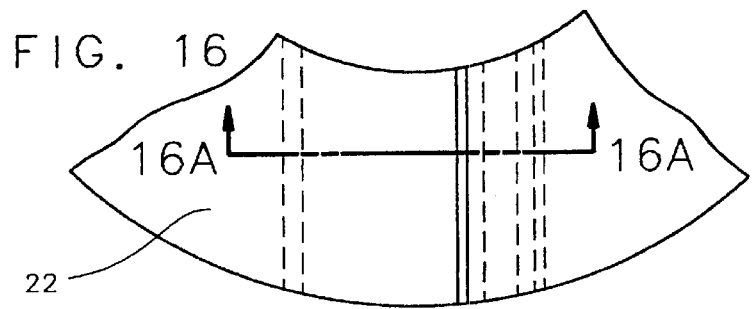
Figure 16A:
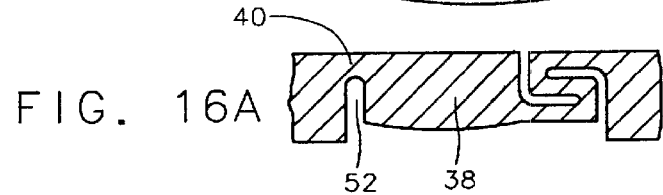
Figure 17:
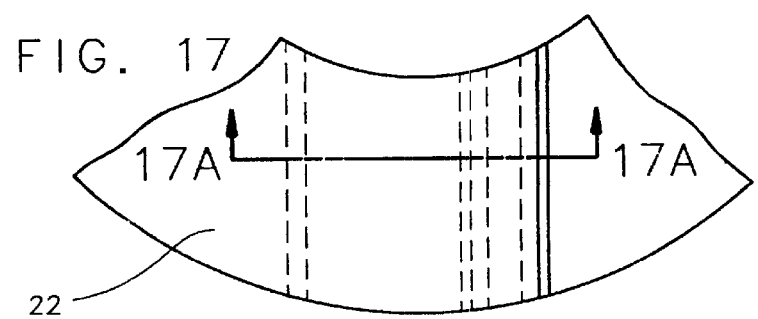
Figure 18:
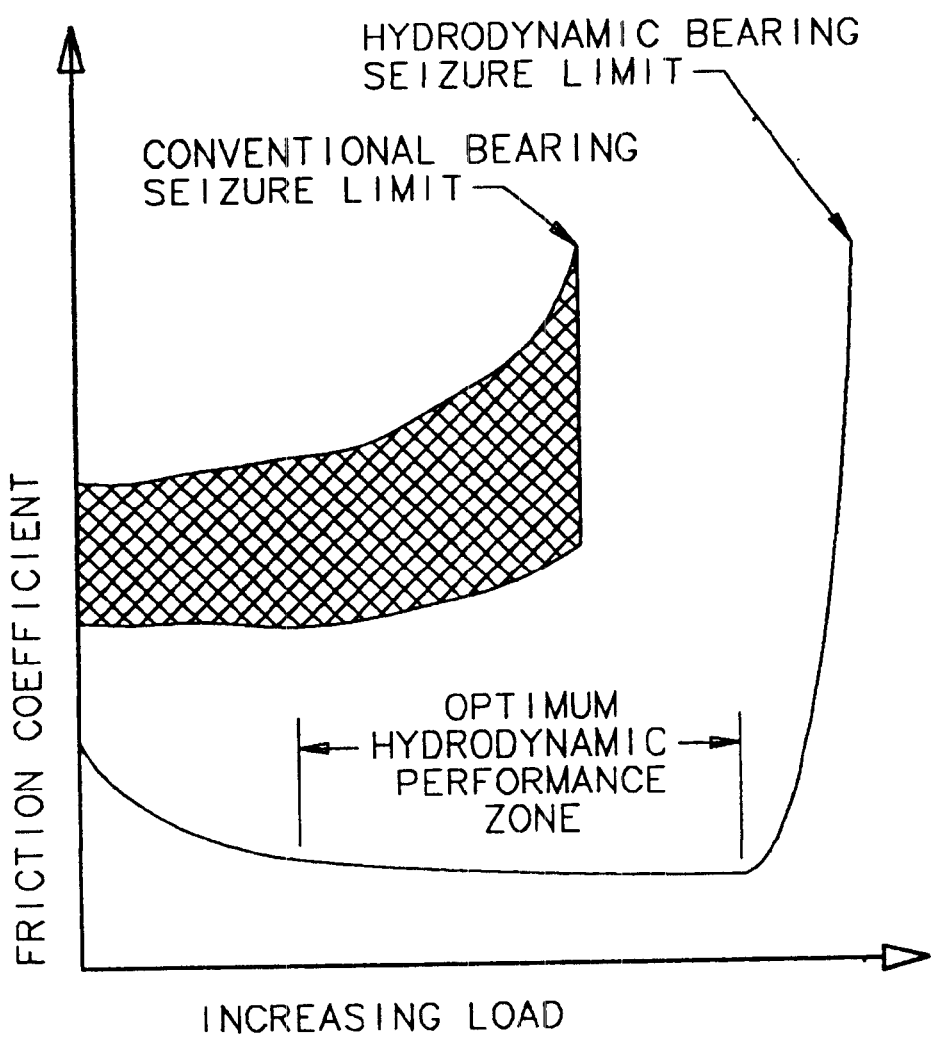
Figure 19:
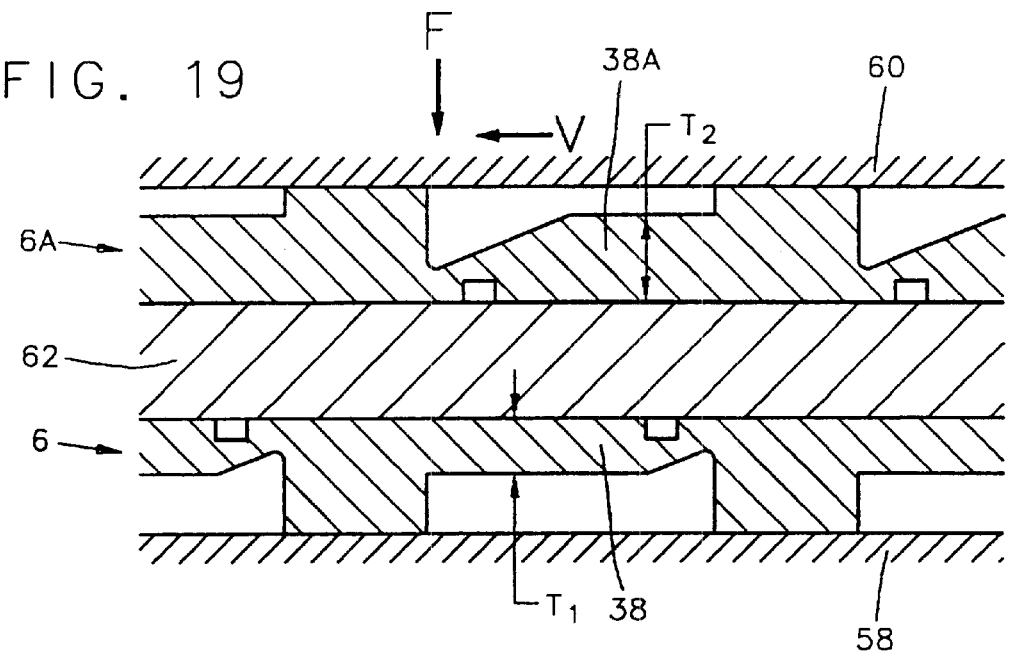
Figure 20:
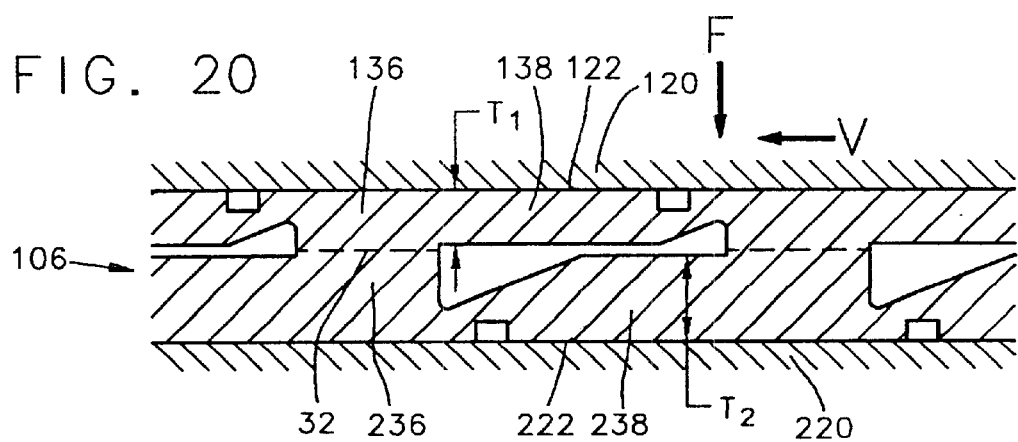
Figure 21:
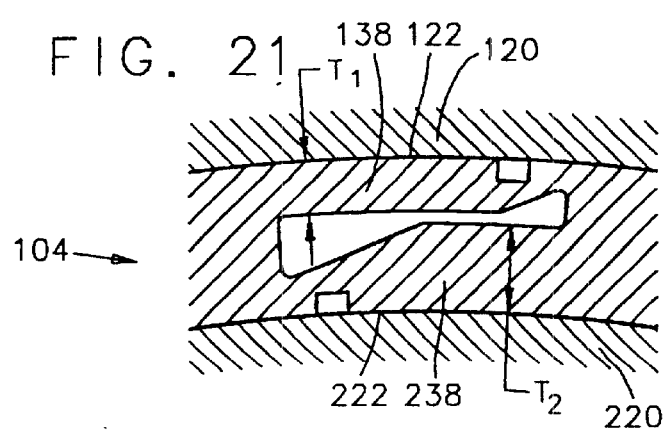

FIG. 2D is a diagrammatic illustration illustrating the load flexed condition of one of the repetitive segments of the load responsive hydrodynamic bearing of the present invention and with hydrodynamic pressure distribution resulting from load and relative rotational velocity during operation and with the load flexed condition of the bearing segment being exaggerated to promote ease of understanding the concept of the invention;

FIG. 3 is a diagrammatic illustration of the load flexed condition of one of the repetitive segments of a load responsive hydrodynamic journal or radial bearing having a dynamic surface at the inside of the bearing for load responsive hydrodynamic lubrication of an external cylindrical surface such as a shaft surface;

FIG. 4 is a diagrammatic illustration of the load flexed condition of one of the repetitive segments of a load responsive hydrodynamic journal or radial bearing having a dynamic surface at the outside surface of a generally cylindrical journal bearing for load responsive hydrodynamic lubrication of an internal cylindrical surface such as the inner surface of a housing or shaft;

FIG. 5 is a fragmentary plan view of a load responsive hydrodynamic thrust bearing having a substantially planar dynamic surface;

FIG. 5A is a sectional view taken along line 5A—5A in FIG. 5 and showing the bottom bearing geometry defining hinged beams and an intermediate weakened or knee section defined by a downward facing groove or slot;

FIG. 6 is a fragmentary plan view of a load responsive hydrodynamic thrust bearing having a substantially planar dynamic surface that is interrupted by an upwardly facing groove;

FIG. 6A is a sectional view taken along line 6A—6A in FIG. 6 and showing the bottom bearing geometry defining hinged beams and an intermediate weakened or knee section defined by the upwardly facing groove or slot and by other undercut regions of the bearing;

FIG. 7 is a fragmentary plan view of a load responsive hydrodynamic thrust bearing having a substantially planar dynamic surface that is interrupted by an upwardly facing groove which extends substantially across the dynamic surface but intersects only the inner circular edge of the thrust bearing;

FIG. 8 is a fragmentary plan view of a load responsive hydrodynamic thrust bearing having a substantially planar dynamic surface that is interrupted by an upwardly facing groove such as is also shown in FIG. 6;

FIG. 8A is a sectional view taken along line 8A—8A in FIG. 8 and showing the bottom bearing geometry to be of tapered configuration for defining controlled flexibility of one of the hinged beams and a substantially planar geometry in the region of an intermediate weakened or knee section which is also defined in part by the upwardly facing groove or slot;

FIG. 9 is a fragmentary plan view of a load responsive hydrodynamic thrust bearing having a substantially planar dynamic surface that is interrupted by an upwardly facing groove;

FIG. 9A is a sectional view taken along line 9A—9A in FIG. 9 and showing the bottom thrust bearing geometry illustrating beam flexibility control by a tapered surface causing the thickness of the second beam to increase from the second hinge to the local weakening section of the thrust bearing;

FIG. 10 is a fragmentary plan view of a load responsive hydrodynamic thrust bearing having a dynamic surface geometry being the same as shown in FIGS. 8 and 9;

FIG. 10A is a sectional view taken along line 10A—10A in FIG. 10 and showing the bottom thrust bearing geometry illustrating beam flexibility control by a downward facing bottom groove which is in registry with the upwardly facing groove for defining a weakened knee section of the bearing and downwardly facing lateral slots which provide for independent control of geometrical parameters that can be varied to enhance hinge flexibility of the beams and permit desired deflected shape of the bearing under applied load;

FIG. 11 is a plan view of an alternative embodiment of the present invention which achieves controlled flexibility of the load responsive hydrodynamic bearing by providing a weakening region defined by a plurality of strategically arranged through holes which also provide for feeding of lubricant at the dynamic surface of the bearing;

FIG. 11A is a sectional view taken along line 11A—11A of FIG. 11 and showing through hole location in the local weakening section to provide a knee between the beams of the repetitive bearing section shown in the section;

FIG. 11B is a sectional view taken along line 11B—11B of FIG. 11 showing an imperforate cross-section of the bearing;

FIG. 11C is a bottom view of the load responsive hydrodynamic bearing of FIG. 11 and showing the relationship of the weakening perforations to the support regions and beam regions of the bearing;

FIG. 12 is a fragmentary plan view of a load responsive hydrodynamic thrust bearing similar to that of FIGS. 11–11C showing perforations for controlled weakening which intersect a planar dynamic surface of the bearing;

FIG. 12A is a sectional view taken along line 12A—12A of FIG. 12 and showing the undercut region of the bearing being defined in part by a tapered back face surface in the flexing section between the hinge regions of the bearing;

FIG. 13 is a fragmentary plan view of a load responsive hydrodynamic thrust bearing similar showing perforations for controlled weakening which are located to define the knee and which intersect a planar dynamic surface of the bearing;

FIG. 13A is a sectional view taken along line 13A—13A of FIG. 13 and illustrates a transverse weakening groove at the back face of the bearing to provide a more pronounced local weakening section;

FIG. 14 is a fragmentary plan view of a load responsive hydrodynamic thrust bearing similar to that shown in FIGS. 13 and 13A and having perforations for controlled weakening with some of the perforations intersecting an upwardly facing transverse slot for pronounced local weakening at the knee of the bearing;

FIG. 14A is a sectional view taken along line 14A—14A of FIG. 14 and showing the undercut region of the bearing being defined in part by a tapered back face surface in the flexing section between the hinge regions of the bearing;

FIG. 15 is a fragmentary plan view of a load responsive hydrodynamic thrust bearing having a planar upper surface which is intersected by a slot formed by an S-shaped second beam structure which defines the local weakening section of the bearing;

FIG. 15A is a sectional view taken along line 15A—15A of FIG. 15 and showing the S-shaped or convoluted second beam geometry in relation with the undercut region of the bearing;

FIG. 16 is a fragmentary plan view of a load responsive hydrodynamic thrust bearing similar to the embodiment of FIGS. 15–15A;

FIG. 16A is a sectional view taken along line 16A—16A of FIG. 16 and showing the undercut back face region of the bearing to be contoured and to incorporate transverse grooves for enhancing hinge flexibility and for controlled flexibility of the beam structures;

FIG. 17 is a fragmentary plan view of a load responsive hydrodynamic thrust bearing similar to the embodiment of FIGS. 16–16A and having an S-shaped or convoluted second beam geometry of a differing configuration for hinge interconnection of the beams;

FIG. 18 is a graphical representation of the coefficient of friction in relation to load and comparing the conventional bearing seizure limit with that of the load responsive hydrodynamic thrust and radial bearings embodying the principles of the present invention and further illustrating the broad range of the optimum hydrodynamic performance zone that is afforded by the invention;

FIG. 19 is a partial sectional view showing a pair of load responsive hydrodynamic bearings of the present invention having differing characteristics of load response and differing optimum performance zones and providing exceptional bearing performance over a wide range of load and pressure conditions;

FIG. 20 is a partial sectional view of a load responsive hydrodynamic bearing which in a single integral bearing unit, because of its differing load responsive repetitive segments, provides for similar wide range bearing performance in the same manner as the embodiment of FIG. 19;

FIG. 21 is a partial sectional view illustrating substantially the same integral wide range load responsive hydrodynamic bearing concept of the embodiment of FIG. 20 in a radial bearing such as a journal bearing;

FIG. 22 is a plan view of a load responsive hydrodynamic thrust bearing embodying the principles of the present invention and having radially oriented geometric features at the dynamic and static surfaces of the bearing for controlled flexing of the bearing under load to achieve hydrodynamic lubricating bearing geometry;

FIG. 22A is a sectional view taken along line 22A—22A of FIG. 22;

FIG. 22B is a sectional view taken along line 22B—22B of FIG. 22 illustrating the non-loaded condition of the bearing and showing a radial slot intersecting the planar dynamic surface and showing the geometry of the undercut region of the bearing for defining hinged beams with a locally weakened knee section between the beams;

FIG. 22C is a sectional view taken along line 22C—22C of FIG. 22;

FIG. 22D is a sectional view taken along line 22D—22D of FIG. 22, the section being taken through an upwardly facing radially oriented slot and further emphasizing the tapered geometry of parts of the bearing; and FIG. 22E is a sectional view taken along line 22E—22E of FIG. 22.

DETAILED DESCRIPTION OF THE INVENTION

Figure 1:
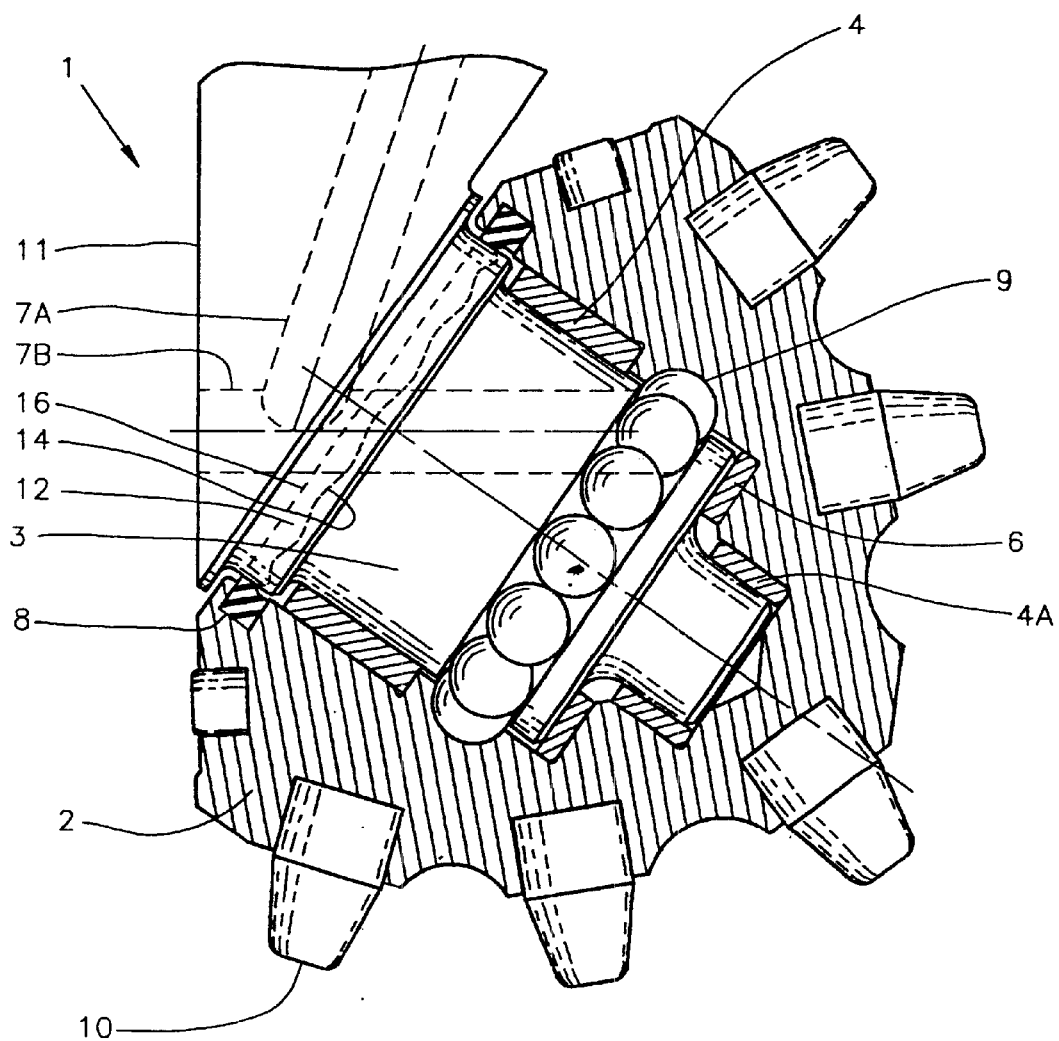

Referring now to the drawings and first to FIG. 1, there is shown in the partial cross-sectional view generally at 1 the lower portion of the body structure of a rotary cone rock bit used for drilling a bore hole through rock formations, and incorporating the improved bearing and seal system of the present invention.

The bit body structure is connectable to a drill string that is supported by a drilling rig. The lower end of the body structure is provided with a support shaft structure such as projecting shaft 3 about which is received a rotary cone 2 that is provided with a plurality of cutter inserts 10 formed from a hard material, such as tungsten carbide or polycrystalline diamond, which cut the formation as the drill bit is rotated under weight. The total weight-on-bit is typically shared by three of the cone assemblies such as shown in FIG. 1, even though as few as one cone assembly can be employed. Drilling fluid is circulated down through the drill string, thence through one or more drill bit orifices (not shown in FIG. 1) into the bottom of the bore hole to transport the cuttings back to the earth's surface. The cone assemblies are supported by arms 11 that may be welded together to form the integral body structure. The body structure, the shaft 3 and the rotary cone 2 and its cutting teeth may take any of a number of suitable forms without departing from the spirit and scope of the invention.

The rotary cone 2 may be retained in assembly with the shaft 3 by a plurality of ball bearings 9. The shaft 3 and rotary cone 2 define generally opposed bearing races which receive the ball bearings 9, which are introduced through the drilled passage 7B. After introducing the ball bearings 9, a conventional drill bit plug member (not shown in FIG. 1) is inserted into drilled passage 7B then sealed off and retained by welding or by any other suitable means. The plug member forms a portion of the bearing race, and is provided with a lubricant communication passage which conducts lubricant to the bearing interface. Although the rotary cone 2 is illustrated as being retained by ball bearings 9, the rotary cone 2 may be retained by any suitable means without departing from the spirit and scope of the invention.

The load between the relatively rotatable surfaces of the rotary cone 2 and the shaft 3 is shared by journal bearings 4 and 4A, and a thrust bearing 6, one or more of which are of the hydrodynamic form described herein. Static loading of such hydrodynamic bearings produces an efficient hydrodynamic lubricant wedging geometry, via flexure of a portion of the bearing at multiple circumferential locations, that separates the majority of the asperities of the dynamic surface of the bearing from the asperities of the mating relatively rotatable surface and thereby minimizes friction, bearing wear, torque, and heat generation.

The bearings are lubricated by a lubricant that fills the entire space between the rotary cone 2 and the shaft 3. This lubricant filled space is in communication with a lubricant supply system (not shown in FIG. 1) that may be of conventional nature and incorporates a piston, rubber boot, or bellows to partition the lubricant from the surrounding drilling fluid environment and substantially balance the pressure of the lubricant to the high ambient hydrostatic pressure of the downhole drilling environment. The communication between the interior of rotary cone 2 and the lubricant supply system is provided through a series of drilled passages 7A and 7B. The pressure equalizing piston, rubber boot, or bellows communicates the high hydrostatic pressure (typically a few thousand pounds per square inch) to the lubricant present at all the bearing locations while excluding the drilling fluid environment. The lubricant supply system may take any one of a number of suitable forms without departing from the spirit and scope of the invention. For example, the lubricant supply system may conveniently take the form shown in U.S. Pat. No. 4,375,242, assigned to Hughes Tool Co., or a lubricant supply system of any other convenient form. It is however preferred that the lubricant supply system provide a slight amplification of the lubricant pressure above that of the ambient hydrostatic pressure by using spring loading, a differential area piston, or a flow restriction approach. It is desired that the lubricant pressure be around 200 to 300 psi higher than the ambient hydrostatic pressure occuring in the wellbore annulus. This pressure differential, which is intended to be in excess of the pressure fluctuations caused by wobble and reciprocation of the rotary cone 2, is desirable to prevent the axial motion of the rotary seals 8 (described below) within their seal grooves, and to force the seals against their respective environment-side groove walls to inhibit skew-induced seal wear. Whereas the life of conventional seals is significantly reduced by differential pressure acting across them, the preferred hydrodynamic seals described below provide excellent life under such pressure differential magnitude, and testing has demonstrated that the resistance of such seals to environmental abrasives is actually significantly improved by such pressure differential.

The lubricated bearings and the shaft are protected from the abrasive drilling fluid and the cuttings by rotary shaft seals 8, which may take any suitable configuration. The preferred seal, which is illustrated, is a hydrodynamically lubricated seal which establishes a dynamic sealing interface 12 with the shaft 3 (represented by hidden lines showing the compressed footprint of the seal against the shaft) and establishes a static sealing interface with the rotary cone 2. The dynamic sealing interface 12 has an non-circular edge configuration 14 on the lubricant side thereof (facing the interior of rotary cone 2) for the purpose of promoting hydrodynamic wedging activity to introduce a lubricant film into the dynamic sealing interface 12 in response to rotation of rotary cone 2. The dynamic sealing interface 12 of the preferred seal has a circular edge configuration 16 on the drilling fluid side thereof for preventing drilling fluid hydrodynamic activity and excluding the drilling fluid. In a high speed rock bit, this type of seal provides the important advantage of lowering the rate of heat generation at the dynamic sealing interface to minimize temperature related seal degradation (such as hardening, compression set blistering, and cracking), and reducing the wear of the seal 8 and shaft 3. This improves the life of the bearings by preventing abrasive invasion thereof associated with rotary seal failure.

The above described dynamic sealing interfacial shape can be established by seals which incorporate a dynamic sealing lip in accordance with U.S. Pat. No. 4,610,319 that have a tapered convoluted surface on the lubricant side thereof disposed for contact with the lubricant and for contact with the surface of the shaft 3 for acting cooperatively with the lubricant in response to relative rotation to lubricate the dynamic surfaces of the seal.

Referring now to FIGS. 2–2D, the details of a thrust bearing 6 of the present invention are shown. As shown in FIG. 2D, the thrust bearing 6 is sandwiched between a first surface 20 and a second surface 30 which are relatively rotatable with respect to one another. The thrust bearing 6 has a dynamic surface 22 and a static surface 32 that contact first surface 20 and second surface 30 respectively.

In the embodiment of FIGS. 2–2D, dynamic surface 22 is a substantially flat surface with no interruptions, whereas the static surface 32 has interruptions caused by multiple undercut regions 34 which define multiple flexing regions 37. The multiple undercut regions 34 are preferably open-ended, passing completely through the local width of the bearing. The flat face geometry of the dynamic surface 22 without any interruptions (e.g., grooves, slots) maximizes the bearing surface contact area and minimizes the average bearing pressure for a given load.

FIGS. 2A and 2D show the important details of the thrust bearing cross-section that are responsible for hydrodynamic lubrication of the dynamic interface. Each repetitive segment 35 of the bearing is defined by a support region 36 of length $B_0$ and a flexing region 37 of length $B_1$+length $B_2$ as shown in FIG. 2D. The support region 36 of a bearing segment is characterized by a substantially solid portion of the bearing. The flexing region 37 of the repetitive segment 35 is characterized by a first beam-like portion 38, a second beam-like portion 39, and a flexible knee 50 defined by local weakening geometry 44. In this embodiment local weakening geometry 44 takes the form of a slot, but it can take other specific form without departing from the spirit or scope of the invention, such as the various geometries described later in conjunction with subsequent figures. First beam-like portion 38 is connected to a support region 36 by a first hinge 40, and second beam-like portion 39 is connected to another support region 36 by a second hinge 42.

In the embodiment of FIGS. 2–2D, the first beam-like portion 38, second beam-like portion 39, and local weakening geometry 44 each span the entire radial width of the bearing. The number of repetitive segments 35 will typically vary from a minimum of 2 to 10 for bearings of this invention which are employed in rotary cone drill bits, depending upon the bearing size, thickness, bearing material, and load capacity. However, there is no upper limit to the number of repetitive segments that may be employed in this invention in larger size bearings used in equipment other than drill bits.

It has been confirmed by detailed finite element analysis that when the bearing of the geometry shown in FIGS. 2–2D is loaded statically the elastic displacement of the flexing region 37 creates an initial gap between first surface 20 and dynamic surface 22, the gap being maximum in the vicinity of the local weakening geometry 44. The presence of this initial gap ensures development of hydrodynamic lubrication action as soon as relative rotation between first surface 20 and second surface 30 is commenced.

Under load, F, and relative rotation, V, between first surface 20 and second surface 30, the flexing regions 37 of the bearing create a desirable deflected shape of the dynamic surface 22, as shown in exaggerated scale in FIG. 2D. Under load, the first beam-like portion 38 hinges about the first hinge 40 and deflects away from the first surface 20, the second beam-like portion 39 hinges about the second hinge 42 and also deflects away from the first surface 20. Bending occurs between the first beam-like portion 38 and the second beam-like portion 39 at flexible knee 50 due to the weakening effect of local weakening geometry 44. The flexibility of first hinge 40, second hinge 42, and the flexible knee 50 can be controlled by varying the thickness at the corresponding locations, or by otherwise reducing the amount of local material, as will be described later in conjunction with other figures. The deflection of the dynamic surface 22 under load and the hydrodynamic pressure distribution is dictated by the flexibility of the first hinge 40 and second hinge 42, flexibility of the flexible knee 50, and by the stiffnesses of the first beam-like portion 38 and the second beam-like portion 39. The load distribution causes the originally flat dynamic surface 22 to deflect and form converging surface portion 22A which establishes a convergent gap in the rotational direction between the dynamic surface 22 and the mating first surface 20 in the region of the first beam-like portion 38; and causes it to deflect and form diverging surface portion 22B which establishes a divergent gap (in the rotational direction) between the dynamic surface 22 and the mating first surface 20 in the region of the second beam-like portion 39. The relative span of the convergent and divergent portions of the gaps is determined by the location of the local weakening geometry 44 that establishes the flexible knee 50. As shown in FIG. 2D, the relative velocity and the convergent gap generate hydrodynamic pressure, which builds up to a maximum value of $P_{max}$ (above the ambient hydrostatic pressure). Due to hydrodynamic pressure generation, the deflection of the first beam-like portion 38 and the second beam-like portion 39 and the size of the gap in the vicinity of the flexible knee 50 increases under relative rotation, as compared to static load conditions.

Hydrodynamic wedging action creates a film thickness and pressure that creates a lifting action that separates the dynamic surface 22 of the bearing from the relatively rotating first surface 20. The film thickness varies from a minimum value of $h_0$ to a maximum value of $h_1$ as shown in FIG. 2D. The film pressures thus generated are high enough to eliminate the direct rubbing contact between the majority of the asperities of dynamic surface 22 and first surface 20.

When the embodiment of FIGS. 2–2D is used in oilfield drill bits, the high hydrostatic pressure present downhole prevents the formation of any unpressurized regions or voids and automatically forces the lubricant between the first surface 20 and dynamic surface 22 to maintain a continuous film at the dynamic bearing interface without the necessity of introducing any grooves on the bearing dynamic surface 22. In surface equipment, where such hydrostatic pressure is not present, pressurized lubricant can be supplied to achieve the lubricant feed to the bearing dynamic surface 22 without introducing grooves.

The static surface 32 of the bearing remains stationary with respect to the second surface 30 during rotary operation due to the fact that the friction at this interface is significantly higher than at the hydrodynamically lubricated dynamic interface between first surface 20 and dynamic surface 22. In order to prevent potential slippage during operation, as well as during start-up, the bearing static surface 32 and/or the second surface 30 should be provided with a roughened surface finish to assure high friction. The roughened finish can be obtained by grit blasting or etching, or other equally suitable methods.

FIG. 2B shows the cross-section of the bearing across the entire width from the inside diameter to the outside diameter across the support region 36 of the bearing. The static surfaces 32 are provided with an edge-relief geometry 48 on the outside diameter which exceeds the length or distance of the corner break 46 on dynamic surface 22. The purpose of edge-relief geometry 48 is to reduce the edge loading and high edge stresses on the bearing. For example, when the bearing of the present invention is employed in oilfield drill bits, such high edge stresses can be caused by unavoidable bending moments imposed on the rotary cone 2 (shown in FIG. 1) in conjunction with the axial thrust loads during the drilling operation. The edge-relief geometry 48 is designed to have sufficient stiffness to provide load support to the dynamic surface 22, yet be flexible enough to significantly reduce the edge loading at the corner break 46 under such loads, and thereby reduce wear of dynamic surface 22 and the first surface 20.

During development of the present invention, extensive elastohydrodynamic analyses (which included detailed finite element analyses and hydrodynamic lubrication analyses) were performed to determine the specific geometrical dimensions that create the desired magnitude of bearing deflections and provide the required hydrodynamic pressure, and minimum and maximum film thicknesses under the loads and speed ranges common to the oilfield rock bit application. A large matrix of analyses was performed in which certain geometrical parameters were systematically varied to optimize bearing dimensions for the desired load range. It was found that the minimum film thickness, $h_0$, can be designed to vary from about 20 micro-inches to over 100 micro-inches for the typical load range of drill bits, depending upon the specific geometrical combination of parameters that are selected. Analysis also included variations in material properties (e.g., modulus of elasticity and Poisson's ratio) of the bearing material, as well as lubricant viscosity to cover greases as well as liquid oil-type lubricants. The analyses predicted that the magnitude of hydrodynamic film thicknesses that are generated will significantly reduce the asperity contact and the coefficient of friction between the dynamic surface 22 of the thrust bearing and the mating first surface 20, even under the extremely high loads commonly encountered in oil field rock bits. As discussed later, bearing tests' were performed on a number of geometries described herein with both grease and liquid lubricants that confirmed the significant performance advantages (reduced friction, cooler operation, higher operating load and speed capabilities) obtained by the invention. Although the embodiments disclosed herein are discussed in relation to a preferred direction of relative rotation, analysis and testing have shown that substantial lubrication is also provided under conditions of reverse rotation owing to the hydrodynamic wedging action provided by deflection of the second beam-like portion 39.

During laboratory testing of the thrust bearing embodiments of the present invention, dynamic surface 22 of the original test specimens was coated with 0.001" of silver plating, as is commonly done for the prior art bushing-type thrust bearings commonly used in oilfield rotary cone drill bits and the like to provide boundary lubrication. The mating first surface 20 of the test apparatus was coated with Stellite hard facing, as is common to the surface of drill bit cone assemblies. In the course of testing, the hydrodynamic lubrication provided an exceptionally low coefficient of friction throughout the designed thrust load range. The thrust load was then incrementally increased until a sudden increase in the torque signature indicated that an overload condition had occurred and the bearings were no longer behaving hydrodynamically; i.e. the lubricant film was no longer supporting the load.

The high torque under overload conditions is due to lack of lubrication at the highest portions of dynamic surface 22; i.e. those locations which are directly supported by: support region 36 (see the minimum film thickness location $h_0$ on FIG. 2D, for example), and do not flex in response to load. With the silver plated thrust bearings, once the over-load condition occurred, the soft silver coating was quickly damaged dimensionally, particularly at the portions of dynamic surface 22 directly supported by the support regions 36. Once an over-load damaged the silver plating, the bearing no longer behaved hydrodynamically, even when re-tested within the normal design load range. This is because that once the wear to the silver plating occurred, the angle of deflection of dynamic surface 22 under load does not exceed the plating wear, and the wedging angle necessary for providing a suitable converging gap for hydrodynamic lubrication is not produced. In fact the plating wear is believed to produce an angle which slopes in the wrong direction for hydrodynamic lubrication because the flexing portions of the bearing rebound to a position that is higher than the worn portions of the bearing whenever the current load is less than the previous overload.

Further testing demonstrated that it is preferred that no silver plating be applied to dynamic surface 22 so that dynamic surface 22 has a more wear resistant surface that is more tolerant of over-load conditions. Since silver coating does provide a measure of boundary lubrication under overload conditions, it is instead preferred that the silver coating or other suitable sacrificial coating be applied to the mating first surface 20 rather than to dynamic surface 22. During overload conditions with such a preferred coating arrangement, and when starting up under load, the silver plating still wears, but it is worn off uniformly from first surface 20 and does not affect the hydrodynamic wedging angle of the unplated thrust bearing. Testing has shown that an uncoated bearing running on a silver plated first surface 20 can tolerate and survive overload conditions, and still continue to run hydrodynamically with an exceptionally low friction coefficient when later exposed to normal design loads.

First surface 20 should be softer and less wear resistant than dynamic surface 22 for best bearing wear resistance, and to achieve the highest tolerance to overload conditions and when starting up under load. This can be achieved by coating the first surface 20 with silver, as described above, or with another sacrificial coating or by other suitable methods. It is desirable to treat the dynamic surface 22 of the thrust bearing with a wear resistant coating or other suitable wear resistant surface treatment, and/or to make the thrust bearing from a wear resistant material having good resistance to galling, such as hardened beryllium copper.

Even though beryllium copper is mentioned as a suitable material choice for the present invention, any number of alternate suitable materials with appropriate elastic modulus, strength, temperature capability, and boundary lubrication characteristics can be employed without departing from the spirit or scope of the invention. The material choices can include steel, titanium, aluminum, ductile iron, white iron, etc. The first surface 20 and/or dynamic surface 22 can if desired be treated with any suitable coating or overlay or surface treatment to provide good tribological properties, such as silver plating, carburizing, nitriding, Stellite overlay, Colmonoy overlay, boronizing, etc, as appropriate to the base material and mating material which are employed.

It will be obvious to those skilled in the art that the geometry of the various embodiments of the present invention disclosed herein can be manufactured using any of a number of different processes, such as conventional machining, investment casting, die casting, die forging, etc. Electric discharge machining can also be employed to make unique undercut region shapes.

The bearing design of the present invention was initially developed for equipment such as oilfield rotary cone rock bits to permit operation under high load and high speed combinations not possible with current state of the art designs, but the general principle is applicable to both thrust and journal bearings in many types of equipment, such as but not limited to pumps, oilfield rotating blowout preventers and diverters, oilfield downhole drilling mud motor sealed bearing assemblies, and other applications where space is limited and operating conditions are severe.

FIGS. 3 and 4 show implementation of the features of this invention (discussed in conjunction with FIGS. 2 through 2D for a thrust bearing) in a radial or journal bearing 4 (such as journal bearing 4 and 4A shown in the bit assembly of FIG. 1). It is noted that, contrary to thrust bearings, the normal clearances between the journal bearing inside diameter and the shaft outside diameter provide a converging gap under load even in a conventional, plain sleeve type journal bearing, such as is typically used in rotary cone rock bits. This converging gap already develops a certain amount of hydrodynamic activity to wedge a small magnitude of lubricant film at the location of the maximum bearing pressure, or the minimum clearance. However, the implementation of the load responsive bearing geometry described herein significantly increases the minimum film thickness magnitude, and therefore reduces the coefficient of friction and enhances the performance capability of the journal bearings.

FIG. 3 shows the implementation of the bearing invention in a manner that the bearing dynamic surface 22 is on the inside diameter of the journal bearing 4 and takes the general form of an internal cylinder. Dynamic surface 22 mates against the first surface 20 that is substantially parallel to dynamic surface 22 and takes the general form of an external cylinder. Likewise, the static surface 32 is on the outside of the bearing, and is substantially parallel to the mating second surface 30, and the second surface 30 takes general form of an internal cylinder. Small clearances are provided at both the inner and the outer diameters of the journal bearing 4 ensuring that it can be inserted easily, and ensuring that there is sufficient room to accommodate differential thermal expansion without creating any undesirable deformations of dynamic surface 22. Under radial load and relative rotational velocity, V, between first surface 20 and second surface 30, the dynamic surface 22 of the journal bearing 4 deflects to form a converging gap between the first surface 20 and dynamic surface 22, as shown exaggerated scale in FIG. 3, in the same manner as described in conjunction with FIGS. 2 through 2D for the thrust bearing embodiment of this invention. The hydrodynamic action wedges a film of lubricant which varies in thickness from $h_1$ to $h_0$ along a bearing segment at the maximum load carrying location of the journal bearing. The thicker lubricant film reduces friction and enhances journal bearing performance, allowing it to operate cooler and withstand higher load and speed combinations than are possible with conventional plain-sleeve journal bearings.

FIG. 4 shows that the journal bearing can also be implemented such that the dynamic surface 22 of the bearing is on the outside diameter and takes the general form of an external cylinder. Dynamic surface 22 mates against first surface 20. Static surface 32 mates against the second surface 30, which takes the general form of an external cylinder. Relative rotation, V, between first surface 20 and second surface 30 under load, F, causes the hydrodynamic lubrication action in the same manner as described for FIG. 3.

FIGS. 5 through 17 show a number of variations of specific features of the present invention that can be incorporated as thrust bearings or journal bearings between relatively rotatable members. The specific geometries described in FIGS. 5 through 17 are shown for thrust bearing implementation; however, the description for FIGS. 3 and 4 illustrates how the geometrical features of this invention as described for thrust bearings can be implemented in journal bearings, and as such it can be appreciated that the features shown in FIGS. 5 through 17 can be employed in journal bearings as well as thrust bearings.

FIGS. 5 and 5A show details of a repetitive segment in which the first beam-like portion 38 incorporates a tapered portion 38A leading to the local weakening geometry 44. The objective of providing a taper is to control the magnitude of deflection and the deformed shape of the dynamic surface 22 under load to provide a gradually converging film from the maximum film thickness location, typically at the flexible knee 50 in the vicinity of local weakening geometry 44, to the vicinity of the first hinge 40. Even though not shown, the second beam-like portion 39 can also have a tapered geometry loading from the second hinge 42 to the local weakening geometry 44 to control the magnitude and shape of the deflection of dynamic surface 22 in the diverging portion of the hydrodynamic lubricant film as discussed in conjunction with FIG. 2D.

FIGS. 6 and 6A show an alterative implementation of the local weakening geometry 44 in the form of a recess on the dynamic surface 22 of the bearing. In FIGS. 6 and 6a, the recess takes the form of a slot or groove, however the recess can take other suitable form without departing from the spirit or scope of the invention. The recess permits lubricant to be fed more efficiently and directly at the bearing dynamic surface in the vicinity of flexible knee 50 without relying on hydrostatic pressure to force the lubricant feed, thus making the configuration more suitable for applications having low ambient pressure, such as in atmospheric conditions. The presence of the local weakening geometry 44 in the form of recesses reduces the contact area of dynamic surface 22 and increases the average contact pressure at the dynamic surface 22 for a given load. However, the increase in contact pressure is relatively small if the number and geometry of the recesses is kept small. Whenever recesses are incorporated in the dynamic surface 22, the intersections between the recesses and dynamic surface 22 should be provided with edge-breaks 45 such as radii or chamfers to minimize disruption of the lubricant film.

FIG. 7 shows that the local weakening geometry 44 does not have to span the entire bearing width; instead such local weakening geometry 44 can span only part of the width and still accomplish the objectives of defining flexible knee 50 and feeding lubricant to the dynamic surface 22.

FIGS. 8 and 8A show the implementation of FIGS. 6 or 7 with the exception that the first beam-like portion 38 has a tapered geometry leading to the local weakening geometry 44.

FIGS. 9 and 9A show that the undercut region 34 defining the flexing region 37 of the bearing can be angulated from the second hinge 42 to the first beam-like portion 38 past the local weakening geometry 44. The thickness of the second beam-like portion 39 in this embodiment increases from the second hinge 42 to the local weakening geometry 44.

FIGS. 10 and 10A show additional grooves or slots first hinge groove 52 and second hinge groove 54 which provide a greater design versatility and independent control of geometrical parameters that can be varied to achieve the desired deflected shape under the applied load by controlling flexibility of the first hinge 40 and second hinge 42. These grooves control the thickness of the hinges and create a more pronounced hinging action at the first hinge 40 and second hinge 42. The more pronounced hinge action at these locations allows the dynamic surface 22 of the bearing to deflect under load in such a way that the portion of the dynamic surface 22 across the first beam-like portion 38 and the second beam-like portion 39 acquires a convergent taper and a divergent taper with respect to the mating first surface 20 (not shown), but the dynamic surface 22 remains substantially flat across the length of the first beam-like portion 38 as well as across the length of the second beam-like portion 39. This embodiment provides a much greater versatility in bearing design and its performance capabilities; however, it requires a larger bearing thickness. FIGS. 10 and 10A also show that local weakening geometry 44 can be a plurality of recesses in generally opposed relation and defining flexible knee 50.

It can be appreciated that as an alternative to employment of first hinge groove 52 and second hinge groove 54 to control flexibility at the first hinge 40 and second hinge 42, alternate methods such as deployment of a pattern of holes or recesses can also be employed to control hinge flexibility, such as discussed elsewhere herein in conjunction with the variety of methods available for implementing local weakening geometry 44 to control flexibility of flexible knee 50.

FIGS. 11 through 14 show embodiments in which the local weakening geometry 44 is comprised at least in part of through-holes which provide a flexible knee 50 between the first beam-like portion 38 and the second beam-like portion 39, and which provide communication to feed lubricant at the dynamic surface 22 of the bearing. The use of holes, as opposed to the recesses in dynamic surface 22 previously described, minimizes the loss of load bearing area while accomplishing lubricant feed into the dynamic interfacial region between dynamic surface 22 and the mating first surface 20 (not shown).

FIGS. 11–11C show the cross-sectional details, top view, and bottom view, of the preferred thrust bearing embodiment of this invention, in which the local weakening geometry 44 is established by patterns of holes. The top view, FIG. 11, shows that the dynamic surface 22 is substantially flat and uninterrupted except for the small interruption caused by patterns of two rows of holes defining the local weakening geometry 44 for each repetitive segment of the bearing. The number of holes is increased as one moves away from the second hinge 42 towards the first beam-like portion 38, thereby defining a flexible knee region in the remaining material immediately surrounding the holes. In this example geometry, there are two holes in the first row and three holes in the second row away from the second hinge 42. This permits the lubricant to be already fed in the divergent portion of the deflected section of dynamic surface 22 under load. This is desirable from the standpoint of maximizing the dynamic surface contact area present in the convergent portion of the deflected section of dynamic surface 22 under load; i.e. along the length of first beam-like portion 38. All of the other geometrical features present in this embodiment are the same as described in conjunction with FIGS. 2 through 2D. It can be appreciated that although FIGS. 11–11C illustrate a thrust bearing, the concept of establishing the local weakening geometry 44 with patterns of holes to form a flexible knee region is equally applicable to hydrodynamic journal bearings of the present invention.

In some applications, such as oilfield rotating diverters, thrust bearings must start rotation under heavily loaded conditions, which can result in premature wear to the thrust bearing and mating surface. This can be addressed by routing pressurized oil through the pattern of holes into the interface between dynamic surface 22 and the mating first surface 20 to create an initial hydrostatic film which lubricates the bearing during startup, enhances film thickness during rotary operation, and improves film thickness during any periods of reverse rotation.

FIGS. 12 and 12A show through-holes establishing a local weakening geometry 44. The undercut region 34 is angulated in the flexing section extending from second hinge 42 past the holes 44 to the first beam 38. FIGS. 12 and 12A also show that the undercut region 34 defining the flexing region of the bearing can be angulated from the second hinge 42 to the first beam-like portion 38 past the local weakening geometry 44. The thickness of the second beam-like portion 39 in this embodiment increases from the second hinge 42 to the local weakening geometry 44.

FIGS. 13 and 13A show a more pronounced local weakening geometry established by combining a recess 44A and through-holes 44B.

FIGS. 14 and 14A show a more pronounced local weakening geometry established by combining a recess 44A and through-holes 44B, with recess 44A intersecting dynamic surface 22.

FIGS. 15 and 15A show an alternate embodiment of the present invention wherein the local weakening geometry 44 is provided by generally opposed L-shaped recesses, defining an S-shaped second beam-like portion 39. The second beam-like portion 39 is attached to a support region 36 at second hinge 42, and interfaces with the first beam-like portion 38 at flexible knee 50. As in the case of the previous embodiments, initial load causes deflection of first beam-like portion 38 hinging at first hinge 40, and causes deflection of second beam-like portion 39 hinging at second hinge 42, and causes flexing between the first beam-like portion 38 and the second beam-like portion 39 at flexible knee 50, thereby causing the portion of dynamic surface 22 along first beam-like portion 38 to assume a converging shape that is conducive to hydrodynamic film generation in response to relative rotation of the first surface 20 (not shown).

FIGS. 16 and 16A show an alternate embodiment that is a slight variation of the embodiment shown in FIGS. 15 and 15A wherein first hinge groove 52 controls the thickness and flexibility of the first hinge 40 to create a more pronounced hinging action, in the manner described previously in conjunction with FIGS. 10 and 10A. FIG. 16 also shows the underside of first beam-like portion 38 having a contoured shape to increase the stiffness of first beam-like portion 38 and thereby maintain a less curved shape when deflected in response to load, to maintain a nearly flat, or monotonically converging film thickness in the region between first beam-like portion 38 and the mating first surface 20 (not shown).

Figure 17A:
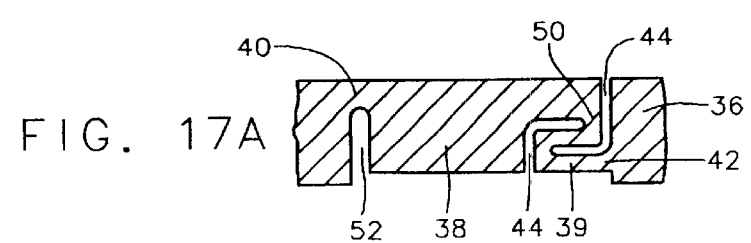

FIGS. 17 and 17A show an improvement to the general arrangement disclosed in FIGS. 15 and 15A which maximizes the area of the converging surface portion of dynamic surface 22, thereby maximizing dynamic load carrying capacity. The local weakening geometry 44 is provided by generally opposed L-shaped recesses, defining an U-shaped second beam-like portion 39. The second beam-like portion 39 is attached to a support region 36 at second hinge 42, and interfaces with the first beam-like portion 38 at flexible knee 50. As in the case of the previous embodiments, initial load causes deflection of first beam-like portion 38 hinging at first hinge 40, and causes deflection of second beam-like portion 39 hinging at second hinge 42, and causes flexing between the first beam-like portion 38 and the second beam-like portion 39 at flexible knee 50, thereby causing the portion of dynamic surface 22 along first beam-like portion 38 to assume a converging shape that is conducive to hydrodynamic film generation in response to relative rotation of the first surface 20 (not shown).

FIG. 18 is a graph of bearing coefficient of friction versus load, and compares the performance of the thrust bearing embodiments of the present load-responsive hydrodynamic bearing invention to comparably sized silver plated, beryllium copper thrust bushings conventionally used in oilfield rotary cone rock bits, as established by extensive laboratory testing. The friction coefficient of a typical drill bit bearing design operating in drill bit grease is about 0.025 and typically varies from about 0.015 to about 0.035 in an erratic fashion.

In the optimum hydrodynamic performance zone of the present invention, the friction coefficient is typically in the range of 0.004 to 0.006-and extremely smooth, thus providing an improvement of approximately fivefold over the typical prior art, even at loads substantially higher than tolerated by the conventional bearings. As shown by the graph, at lower loads the friction coefficient gradually increases, typically reaching 0.008 or higher. As can be seen in the graph of FIG. 18, the friction increases dramatically when the load exceeds the optimum range, and the bearing can begin to seize; however the associated seizure load is considerably higher than that of a conventional drill bit thrust bearing of conventional size. By proper sizing of the flexibility of the flexing regions of the present invention, the optimum hydrodynamic performance zone shown in the graph of FIG. 18 can be adjusted to bracket anticipated service conditions.

During testing of the present invention, not only was the friction coefficient much lower than the prior art, but the bearing temperature was approximately 100° F. cooler under identical test conditions. This temperature reduction is of particular significance to applications such as oilfield rotary cone drill bits, where an elastomeric rotary shaft seal 8 (see FIG. 1) is positioned near the bearings to prevent encroachment of abrasive drilling fluid which is highly destructive to the bearings. By reducing the bearing generated heat which is imparted to the shaft 3 (FIG. 1), the rotary shaft seal 8 is permitted to run cooler, which prolongs the service life of the rotary shaft seal 8, and therefore prolongs the service live of the drill bit itself by preventing abrasive invasion of the bearings.

FIGS. 19–21 illustrate embodiments of the present invention which extend the optimum hydrodynamic performance zone of load responsive elastically flexing bearings over a wider range of loading conditions.

FIG. 19 shows a bearing assembly that employees two thrust bearings 6 and 6A, a first machine element 58, a second machine element 60 having relative rotation with respect to said first machine element 58, and a load transfer ring 62. Thrust bearing 6 remains stationary relative to first machine element 58, and thrust bearing 6A remains stationary relative to second machine element 60. The two thrust bearings 6 and 6A have distinctly different optimum load capabilities as governed by design differences between the bearings, such as the greater beam thickness T2 of first beam-like portion 38A of thrust bearing 6A compared to beam thickness T1 of first beam-like portion 38 of thrust bearing 6, which causes thrust bearing 6A to be adapted for providing optimum lubrication and friction coefficient at a higher optimum load compared to thrust bearing 6. Thus, under lower magnitude loads within the optimum hydrodynamic performance zone of thrust bearing 6, relative rotation will occur at the interface between thrust bearing 6 and the respective mating surface of load transfer ring 62, and at higher magnitude loads beyond the optimum performance zone of thrust bearing 6 but within the optimum hydrodynamic performance zone of thrust bearing 6A, relative rotation will transition to the interface between thrust bearing 6A and the respective mating surface of load transfer ring 62.

It can be appreciated that the bearing arrangement shown in FIG. 19 can be equally effective if the positions of the two thrust bearings 6 and 6A are simply swapped from that shown. It can also be appreciated that although a specific method of varying the optimum load capabilities of the thrust bearings 6 and 6A is shown, i.e. varying the thickness of the first beam-like portions 38 and 38A, other methods can be used without departing from the spirit or scope of the invention. For example, one could vary the length the first beam-like portions 38 and 38A, or vary any of the other feature proportions described herein which affect the hydrodynamic activity, or one could use a different modulus of material in constructing thrust bearing 6 compared to thrust bearing 6A.

FIG. 20 shows a thrust bearing 106 sandwiched between a machine element 120 and a machine element 220, said machine element 120 and machine element 220 being relatively rotatable with respect to one another. Thrust bearing 106 defines dynamic surface 122 for facing machine element 120, and defines dynamic surface 222 in generally opposed relation to dynamic surface 122 for facing machine element 220. Thrust bearing 106 permits both opposing dynamic surfaces 122 and 222 to deflect elastically and provide hydrodynamic action at the interface with the respective mating surfaces. Dynamic surface 122 and dynamic surface 222 of thrust bearing 106 having differing optimum load capabilities as governed by design differences in the respective supporting structures, such as employing a greater thickness T2 of first beam-like portion 238 supporting dynamic surface 222 compared to thickness TI of first beam-like portion 138 supporting dynamic surface 122, which causes dynamic surface 222 to be adapted for providing optimum lubrication and friction coefficient at a higher optimum load compared to dynamic surface 122. Thus, under lower magnitude loads within the optimum hydrodynamic performance zone of dynamic surface 122, relative rotation will occur at the interface between dynamic surface 122 and the respective mating surface of machine element 120, and at a higher magnitude loads beyond the optimum performance zone of dynamic surface 122 but within the optimum hydrodynamic performance zone of dynamic surface 222, relative rotation will transition to the interface between dynamic surface 222 and the respective mating surface of machine element 120. Such a bearing assembly is capable of providing a low friction coefficient over a much wider load range. In this embodiment, first beam-like portion 138 is connected to support region 136, and first beam-like portion 238 is connected to support region 236, and static surface 32 is located at the homogeneous connection between support region 136 and support region 236.

It can also be appreciated that although a specific method of varying the optimum load capabilities of the dynamic surfaces 122 and 222 is shown, i.e. varying the thickness of the first beam-like portions 138 and 238, such is not intended to limit the invention in any way, for other equally effective methods can be used without departing from the spirit or scope of the invention. For example, one could vary the length the first beam-like portions 138 and 238, or vary any of the other feature proportions described herein which affect the hydrodynamic activity. It can also be appreciated that it is possible to vary the hydrodynamic performance of individual repetitive segments within a given bearing for all the various embodiments of load responsive elastically flexing bearings shown and described herein.

FIG. 21 shows a journal bearing 104 sandwiched between a machine element 120 and a machine element 220 with a clearance fit, said machine element 120 and machine element 220 being relatively rotatable with respect to one another. Journal bearing 104 defines dynamic surface 122 for facing machine element 120, and defines dynamic surface 222 in generally opposed relation to dynamic surface 122 for facing machine element 220. Dynamic surface 122 and dynamic surface 222 of journal bearing 104 having differing optimum load capabilities as governed by options discussed above in conjunction with FIGS. 19 and 20, such as the greater thickness T2 of first beam-like portion 238 supporting dynamic surface 222 compared to the thickness T1 of first beam-like portion 138 supporting dynamic surface 122; this causes dynamic surface 222 to be adapted for providing optimum lubrication and friction coefficient at a higher optimum load compared to dynamic surface 122. Thus, under lower magnitude loads within the optimum hydrodynamic performance zone of dynamic surface 122, relative rotation will occur at the interface between dynamic surface 122 and the respective mating surface of machine element 120, and at a higher magnitude loads beyond the optimum performance zone of dynamic surface 122 but within the optimum hydrodynamic performance zone of dynamic surface 222, relative rotation will transition to the interface between dynamic surface 222 and the respective mating surface of machine element 120. p Referring now momentarily to FIGS. 2–2D, the flexing region 37 of the thrust bearing 6 is produced by an undercut region 34 having first undercut flank 41 and a second undercut flank 43 which are substantially parallel to one another, and the axial thickness of first beam-like portion 38 is uniform across the radial width thereof. Support region 36 has an average circumferential support length $B_0$, and first beam-like portion 38 has an average circumferential beam length $B_1$. Optimum hydrodynamic pressure development requires a $B_1/B_0$ ratio that is approximately equal to 2.5, however in bearings having a first undercut flank 41 and second undercut flank 43 which are substantially parallel to one another, this optimum ratio can only be achieved at the average centerline of dynamic surface 22. Because the axial thickness of first beam-like portion 38 is uniform across the radial width thereof, first undercut flank 41 and second undercut flank 43 are kept substantially parallel to one another so that first beam-like portion 38 does not become excessively stiff toward the inside edge thereof. With this type of geometry, uniformity of deflection of dynamic surface 22 is achieved across its width.

FIGS. 22–22E show a thrust bearing 6 having a number of optimized tapering features which provide maximum film thickness and load carrying capability. First undercut flank 41 and second undercut flank 43 of undercut region 34 are configured in a substantially radial orientation, such the ratio of $B_1/B_0$ can remain more effective at every radial location, and can if desired be set approximately equal to the hydrodynamically optimum ratio of 2.5. The axial thickness of first beam-like portion 38 varies across the radial width thereof, being increasingly thinner toward the center of the bearing. In this way, the flexibility of the first beam-like portion 38 is uniform across the width thereof despite the substantially radial orientation of first undercut flank 41 and second undercut flank 43 that cause circumferential beam length $B_1$ to be shorter toward the center of the bearing. Likewise, the axial thickness of second beam-like portion 39 preferably varies across the radial width thereof, being increasingly thinner toward the center of the bearing. In this way, the flexibility of the second beam-like portion 39 is more uniform across the width thereof. Likewise, the axial thickness of flexible knee 50 preferably varies across the radial width thereof, being tapered thinner toward the center of the bearing. In this way, the flexibility of flexible knee 50 is more uniform across the width thereof. It can be appreciated that other thrust bearing embodiments discussed in conjunction with previous figures can also use these same optimization approaches to achieve increased film thickness and load carrying capability. It can also be appreciated that the optimum $B_1/B_0$ ratio discussed in conjunction with the thrust bearing of FIGS. 22–22D is also applicable to the journal bearing embodiments of the present invention.

Please note that the thrust bearing shown in FIGS. 22–22D is illustrated for a direction of rotation that is opposite that of the bearing shown in FIGS. 2–2C, for example. For any application, the bearing should be designed for the specific direction of rotation required by the bearing location, even though the bearings of the present invention will provide a degree of hydrodynamic lubrication when subjected to reverse rotation, as described previously. In the case of designing thrust bearings for drill bits, for example, one must consider whether the bearing dynamic surface is desired to face the cone or the shaft when determining the bearing direction of rotation.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

We claim:

1. A load responsive hydrodynamic bearing for supporting and guiding a relatively rotatable member, comprising:
   (a) a continuous ring shaped body of generally circular form;
   (b) at least one dynamic surface being defined by said body;
   (c) a plurality of support regions being defined by said body, each of said support regions defining a static surface being oriented in generally opposed relation with said at least one dynamic surface;
   (d) a plurality of flexing regions being defined by said body between adjacent support regions, each of said flexing regions having a first beam having a first hinge connection with one of said plurality of support regions a second beam having a second hinge connection with an adjacent one of said plurality of support regions; and
   (e) at least one local weakening geometry being defined by said body intermediate at least one of said flexing regions and defining a flexing knee region interconnecting said first and second beams.

2. The load responsive hydrodynamic bearing of claim 1, comprising:
said at least one dynamic surface being of substantially cylindrical configuration.

3. The load responsive hydrodynamic bearing of claim 1, comprising:
said cylindrical configuration being of external configuration.

4. The load responsive hydrodynamic bearing of claim 2, comprising:
said cylindrical configuration being of internal configuration.

5. The load responsive hydrodynamic bearing of claim 2, comprising:
said at least one dynamic surface being two dynamic surfaces in generally opposed relation, one of said dynamic surfaces being of internal form and the other of said dynamic surfaces being of external form.

6. The load responsive hydrodynamic bearing of claim 1, comprising:
said at least one dynamic surface being of substantially planar configuration.

7. The load responsive hydrodynamic bearing of claim 6, comprising:
said at least one dynamic surface being two dynamic surfaces in generally opposed relation.

8. The load responsive hydrodynamic bearing of claim 6, comprising:
(a) said body having at least one undercut region, said at least one undercut region having a first flank and a second flank; and
(b) said first and second flanks being disposed in substantially parallel relation.

9. The load responsive hydrodynamic bearing of claim 6, comprising:
(a) said body having at least one undercut region, said at least one undercut region having a first flank and a second flank; and
(b) said first and second flanks being disposed in substantially radial orientation.

10. The load responsive hydrodynamic bearing of claim 9, comprising:
said first beam having a first side, a second side and a thickness, said thickness tapering thinner from said first side to said second side.

11. The load responsive hydrodynamic bearing of claim 9, comprising:
said second beam having a first side, a second side and a thickness, said thickness tapering thinner from said first side to said second side.

12. The load responsive hydrodynamic bearing of claim 1, comprising:
(a) said first beam having an average circumferential beam length;
(b) said support region having an average circumferential support region length; and
(c) the ratio of said average circumferential beam length divided by said average circumferential support region length being in the range of 2 to 3.

13. The load responsive hydrodynamic bearing of claim 12, comprising:
said ratio being in the range of 2.4 to 2.6.

14. The load responsive hydrodynamic bearing of claim 1, comprising:
said at least one local weakening geometry being at least one recess.

15. The load responsive hydrodynamic bearing of claim 14, comprising:
said at least one recess being a slot.

16. The load responsive hydrodynamic bearing of claim 14, comprising:
said at least one recess intersecting said dynamic surface.

17. The load responsive hydrodynamic bearing of claim 14, comprising:
said at least one recess forming at least one lubrication passage through said body between said support regions.

18. The load responsive hydrodynamic bearing of claim 14, comprising:
said at least one recess being a plurality of recesses.

19. The load responsive hydrodynamic bearing of claim 14, comprising:
said at least one recess being a plurality of recesses disposed in substantially opposed relation.

20. The load responsive hydrodynamic bearing of claim 19, comprising:
said plurality of recesses each being of L-shaped configuration and collectively defining said second beam forming an S-shaped configuration.

21. The load responsive hydrodynamic bearing of claim 1, comprising:
said at least one local weakening geometry being at least one hole extending through said second beam.

22. The load responsive hydrodynamic bearing of claim 21, comprising:
said at least one hole being a plurality of holes extending through said second beam.

23. The load responsive hydrodynamic bearing of claim 1, comprising:
said at least one local weakening geometry defining at least one recess and having at least one hole extending at least partially through said second beam.

24. The load responsive hydrodynamic bearing of claim 1, comprising:
said first hinge connection having a thickness being defined by a groove.

25. The load responsive hydrodynamic bearing of claim I, comprising:
said second hinge connection having a thickness being defined by a groove.

26. The load responsive hydrodynamic bearing of claim 1, comprising:
(a) said first beam having a thickness;
(b) said thickness at said first hinge having a first dimension;
(c) said thickness at said flexing knee region having a second dimension; and
(d) said first dimension being substantially equal to said second dimension.

27. The load responsive hydrodynamic bearing of claim 1, comprising:
(a) said first beam having a thickness;
(b) said thickness at said first hinge having a first dimension;
(c) said thickness at said flexing knee region having a second dimension; and
(d) said first dimension being greater than said second dimension.

28. The load responsive hydrodynamic bearing of claim 1, comprising:

said second beam having a thickness being variable from said second hinge to said flexing knee region.

29. The load responsive hydrodynamic bearing of claim 1, comprising:

said second beam morning a U-shaped configuration.

30. The load responsive hydrodynamic bearing of claim 1, comprising:

said bearing having a coating of a material having characteristics of lubrication.

31. A load responsive hydrodynamic bearing assembly for supporting, guiding and lubricating a first rotatable member supported by a second relatively rotatable member, comprising:
  (a) first and second spaced relatively rotatable surfaces being defined by said first and second relatively rotatable members and having a lubricant within the space therebetween;
  (b) a continuous ring shaped integral body of generally circular form being located between said first and second relatively rotatable surfaces;
  (c) at least one dynamic surface being defined by said body and establishing a dynamic interface with said first relatively rotatable surface;
  (d) a plurality of support regions being defined by said body, each of said support regions defining a static surface being oriented in generally opposed relation with said at least one dynamic surface and being disposed in supporting engagement with said second relatively rotatable surface;
  (e) a plurality of flexing regions being defined by said body between adjacent support regions, each of said flexing regions having a first beam having a first hinge connection with one of said plurality of support regions a second beam having a second hinge connection with an adjacent one of said plurality of support regions, said first and second beams being flexed under load and defining localized hydrodynamic geometry at said at least one dynamic surface for wedging said lubricant into said dynamic interface; and
  (f) at least one local weakening geometry being defined by said body intermediate said at least one of said flexing regions and defining a flexing knee region interconnecting said first and second beams.

32. The load responsive hydrodynamic bearing assembly of claim 31, comprising:

a solid lubricant coating being provided on said first surface.

33. The load responsive hydrodynamic bearing assembly of claim 32, comprising:

said solid lubricant being silver plating.

34. The load responsive hydrodynamic bearing assembly of claim 31, comprising:

said dynamic surface being of greater hardness as compared with the hardness of said first surface.

35. The load responsive hydrodynamic bearing assembly of claim 31, comprising:
  (a) a support shaft structure of a rotary cone-type drill bit defining said first relatively rotatable surface; and
  (b) a rotary cone of a rotary cone-type drill bit defining said second relatively rotatable surface.

36. The load responsive hydrodynamic bearing assembly of claim 35, comprising:
  (a) a rotary shaft seal defining a dynamic sealing interface with said support shaft structure; and
  (b) said rotary shaft seal defining hydrodynamic geometry for wedging said lubricant into said dynamic sealing interface.

37. The load responsive hydrodynamic bearing assembly of claim 36, comprising:

said lubricant being a liquid lubricating oil.

38. The load responsive hydrodynamic bearing assembly of claim 37, comprising:

said liquid lubricating oil being a synthetic lubricating oil.

39. The load responsive hydrodynamic bearing assembly of claim 3 1, comprising:
  (a) a rotary cone of a rotary cone-type drill bit defining said first relatively rotatable surface; and
  (b) a support shaft structure of a rotary cone-type drill bit defining said second relatively rotatable surface.

* * * * *

UNITED STATES PATENT AND TRADEMARK OFFICE
CERTIFICATE OF CORRECTION

PATENT NO. : 6,460,635 B1 Page 1 of 1
DATED : October 8, 2002
INVENTOR(S) : Manmohan S. Kalsi, Dezso Somogyi and Lannie L. Dietle It is certified that error appears in the above-identified patent and that said Letters Patent is hereby corrected as shown below:

<u>Title page,</u>
Item [56], U.S. PATENT DOCUMENTS, insert -- 5,096,004  03/1992 --

<u>Column 10,</u>
Line 55, after "set", insert -- , --

<u>Column 13,</u>
Line 55, after "the", insert -- thrust --
Line 66, delete ":"

<u>Column 23,</u>
Line 5, delete "1", insert -- 2 --

<u>Column 25,</u>
Line 7, delete "morning", insert -- forming --

<u>Column 26,</u>
Line 36, delete "3 1,", insert -- 31 --

Signed and Sealed this

Fifteenth Day of July, 2003

JAMES E. ROGAN
*Director of the United States Patent and Trademark Office*